(12) United States Patent
Yamaguchi et al.

(10) Patent No.: US 8,330,976 B2
(45) Date of Patent: Dec. 11, 2012

(54) PRINTING DATA HELD ON A WWW SERVER

(75) Inventors: Koutaro Yamaguchi, Kanagawa-ken (JP); Hiroyuki Sato, Tokyo (JP); Yasushi Shimizu, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 320 days.

(21) Appl. No.: 11/430,230

(22) Filed: May 9, 2006

(65) Prior Publication Data

US 2006/0203285 A1    Sep. 14, 2006

Related U.S. Application Data

(62) Division of application No. 09/178,898, filed on Oct. 27, 1998, now Pat. No. 7,274,474.

(30) Foreign Application Priority Data

Oct. 27, 1997  (JP) .................................. 9-311395
Nov. 14, 1997  (JP) .................................. 9-329653

(51) Int. Cl.
*G06F 3/12* (2006.01)
*G06K 15/00* (2006.01)

(52) U.S. Cl. ...................... 358/1.15; 358/1.13; 358/1.16

(58) Field of Classification Search ............... 358/1.13, 358/1.15, 1.16, 1.17, 1.18; 395/200, 114, 395/117, 615, 335, 106, 111; 707/26, 1; 345/352
See application file for complete search history.

(56) References Cited

U.S. PATENT DOCUMENTS

| 5,247,575 | A |   | 9/1993  | Sprague et al. ................ 705/53 |
|-----------|---|---|---------|---------------------------------------|
| 5,287,194 | A |   | 2/1994  | Lobiondo .................... 358/296  |
| 5,327,526 | A |   | 7/1994  | Nomura et al. ............. 358/1.16   |
| 5,625,781 | A | * | 4/1997  | Cline et al. .................... 715/854 |
| 5,699,494 | A |   | 12/1997 | Colbert et al. ............... 358/1.15 |
| 5,768,483 | A |   | 6/1998  | Maniwa et al. ............. 358/1.15   |
| 5,848,413 | A | * | 12/1998 | Wolff ............................. 707/10 |
| 5,870,767 | A |   | 2/1999  | Kraft, IV .................... 707/501  |
| 5,950,173 | A | * | 9/1999  | Perkowski .................. 705/27.1  |

(Continued)

FOREIGN PATENT DOCUMENTS

JP            06-068104       3/1994

(Continued)

OTHER PUBLICATIONS

Pipeline's Internet Printing System Lets the Printer Surf the Web, Pipeline Corporation, The hard copy Observer, p. 45, 46, Mar. 1997.

(Continued)

*Primary Examiner* — Steven Kau
*Assistant Examiner* — Neil R McLean
(74) *Attorney, Agent, or Firm* — Fitzpatrick, Cella, Harper & Scinto

(57) ABSTRACT

To enable data in a WWW server on a network to be directly obtained without passing through an information processing apparatus and to reduce a load which is applied to the network when the data obtained from the WWW server is printed, a digital copier has a function, namely, a Web Pull Printing function for actively accessing to the WWW server, obtaining data of an HTML format in the WWW server, and printing by a self printer. A Web print request to the digital copier by the user is executed through a print utility which is operating on a client.

17 Claims, 38 Drawing Sheets

U.S. PATENT DOCUMENTS

| | | | |
|---|---|---|---|
| 5,956,487 A * | 9/1999 | Venkatraman et al. | 709/218 |
| 5,978,807 A | 11/1999 | Mano et al. | 707/10 |
| 5,999,968 A | 12/1999 | Tsuda | 709/213 |
| 6,091,518 A | 7/2000 | Anabuki | 358/500 |
| 6,105,028 A | 8/2000 | Sullivan et al. | 707/10 |
| 6,222,634 B1 * | 4/2001 | Dubbels et al. | 358/1.15 |

FOREIGN PATENT DOCUMENTS

| | | |
|---|---|---|
| JP | 06-083747 | 3/1994 |
| JP | 06-340151 | 12/1994 |
| JP | 07-160350 | 6/1995 |
| JP | 07-200423 | 8/1995 |
| JP | 08-171465 | 7/1996 |
| JP | 08-272720 | 10/1996 |
| JP | 08-335147 | 12/1996 |
| JP | 09-083743 | 3/1997 |
| JP | 09-168027 | 6/1997 |
| JP | 09-231028 | 9/1997 |
| JP | 09-265482 | 10/1997 |

OTHER PUBLICATIONS

Electronic version of The American Heritage Dictionary of English Language, third edition, Houghton Mifflin Company, 1992.

* cited by examiner

FIG. 11

| Monitor | | | | |
|---|---|---|---|---|
| Owner | Host | Job No. | Job Name | Schedule |
| Michael | PC001 | 1 | WWW.canon.co.jp | |
| Paul | PC123 | 2 | WWW.canon.com | Weekly |
| Michael | PC001 | 3 | WWW.cis.com | Monthly |
| Paul | PC123 | 4 | WWW.canon.co.jp | |

Delete — Close

FIG. 12

| "HPC001" | LF | "Jwww.canon.co.jp" | LF | "PMichael" |

H—Host name
J—Job name
P—User identification

FIG. 13A
LPR COMMAND FORMAT

| COMMAND ID (LPR) 03h | DATA FILE LENGTH | SP (20h) | DATA FILE NAME | LF (0Ah) | 02h | CONTROL FILE LENGTH | SP (20h) | CONTROL FILE NAME | DATA FILE | CONTROL FILE |
|---|---|---|---|---|---|---|---|---|---|---|

FIG. 13B
LPQ COMMAND FORMAT

| COMMAND ID (LPQ) 03h | PRINTER QUEUE NAME | SP (20h) | JOB NO. LIST | LF (0Ah) |
|---|---|---|---|---|

FIG. 13C
LPRM COMMAND FORMAT

| COMMAND ID (LPRM) 05h | PRINTER QUEUE NAME | SP (20h) | USER NAME | SP (20h) | JOB NO. LIST | LF (0Ah) |
|---|---|---|---|---|---|---|

FIG. 26

| LOG LIST | | | | |
|---|---|---|---|---|
| No. | URL | DATE | TIME | RESULT |
| 1 | http://www.abcdefg.co.jp/ | 1997/5/14 | 12:30 | SUCCESS |
| 2 | http://www.aaaa.co.jp/ | 1997/5/14 | 10:00 | RESETED |
| 3 | http://www.bbbb.com/ | 1997/5/13 | 2:30 | ERROR |
| 4 | http://www.cccc.co.jp/ | 1997/5/13 | 0:00 | SUCCESS |
| 5 | http://www.dddd.co.jp/ | 1997/5/12 | 1:00 | SUCCESS |

FIG. 36

THIS PAGE IS OUTPUT FROM
http://www.sample.company.co.jp/test.html
AT 1997/6/20  17:00

This
And
abcde
ABCD
AB

*FIG. 38*

THIS PAGE HAS NOT BEEN UPDATED FROM THE DATA OUTPUT FROM http://www.sample.company.co.jp/test.html

AT 1997/6/20   17:00

PRINTING DATA HELD ON A WWW SERVER

This application is a division of application Ser. No. 09/178,898, filed Oct. 27, 1998 (pending).

BACKGROUND OF THE INVENTION

1. Field of the Invention

The invention relates to an image forming apparatus and an image forming method for printing data of a WWW server and also relates to its storing medium.

2. Related Background Art

In recent years, in association with the realization of a network of information, there has been realized a system in which a WWW (World Wide Web) server which holds various information and a computer in which dedicated software (hereinafter, referred to as a browser) to access to the server by an HTTP (Hyper Text Transfer Protocol) has been installed are connected by a network (internet, intranet) and the information on the WWW server can be referred from the computer. In this system, since the information on the WWW server can be stored into the computer by the browser, a print output of the information which has once been stored in the computer is instructed to a printer from the user, thereby enabling the information on the WWW server to be printed and outputted by the printer.

According to the foregoing conventional method, however, in order to obtain the information on the WWW server as print information, it is necessary for the user to designate the printing to information equipment having a printing function after waiting for him to once finish the storage of all of the information into the computer. Therefore, in the case where it takes time to obtain the information from the WWW server due to a cause of a traffic of the network or the like, the user has to wait until the information is stored into the computer. When the obtained data is printed, a process for converting the data to a format which can be printed by the information equipment having the printing function needs to be executed by the computer. Therefore, processes in the computer become heavy and become an obstacle in case of executing another program in parallel.

In the case where the information equipment having the printing function which is used is equipment connected onto the network, information transfers of two times of an information transfer from the WWW server to the computer and an information transfer from the computer to the information equipment occur, this results in a cause of an increase in traffic of the network. Particularly, in many cases, a size of data converted to the format that can be printed by the information equipment is large and, in case of transferring the information from the computer to the information equipment, the influence on the traffic is large.

In recent years, in association with the development of the computer network technique, various information can be freely obtained through various information media, information services, or the like. However, those information is updated everyday and in order to always obtain the latest information, the user needs to periodically perform a similar operation on the computer. For example, in case of periodically printing out in order to always get the latest information, the user accesses to a desired information resource on the WWW server from an application on the computer and obtain it every print-out and, after that, issues a print request to the printer by a printer driver.

However, the operations such that a desired information resource on the WWW server is accessed from the application on the computer and is obtained each time the print-out is performed and, after that, a print request is issued to the printer by the printer driver as mentioned above need fairly many works and are troublesome. Particularly, when a frequency of accessing to the information resource is high, such a problem is serious.

SUMMARY OF THE INVENTION

It is an object of the invention to provide an image forming apparatus which can directly obtain data of a WWW server on a network without passing through an information processing apparatus and can reduce a load which is applied to the network when the data obtained from the WWW server is printed.

Another object of the invention is to provide an image forming apparatus, an image forming method, and a storing medium, in which data can be directly obtained from a WWW server on a network without passing through an information processing apparatus and an operability regarding the printing of the data obtained from the WWW server can be improved.

Still another object of the invention is to provide an image forming apparatus, an image forming method, and a storing medium, in which data can be directly obtained from a WWW server on a network without passing through an information processing apparatus and it is possible to set so as to execute a printing of the data obtained from the WWW server in accordance with a situation of the user.

Further another object of the invention is to eliminate a vain print output so as to print and output updated new information when a specific information resource that is provided by a server on a computer network is enabled to be automatically and periodically accessed and printed.

According to the invention, an image forming apparatus for printing data held in a WWW server on a network has a printing function for obtaining the data held by the WWW server by accessing to the WWW server through the network, for converting the obtained data into image data which can be print processed, and for printing the image data.

The image forming apparatus further comprises: input means for inputting print parameters such as URL or the like for the WWW server; data obtaining means for obtaining the data held in the WWW server by accessing to the WWW server; image data forming means for forming image data from the data obtained by the data obtaining means; and printing means for printing the image data formed by the image data forming means.

According to the invention, there is provided an image forming apparatus for constructing an image forming system to obtain and print data on a WWW server on a network in cooperation with an information processing terminal connected to the WWW server through the network, wherein the apparatus has a printing function for obtaining the data held in the WWW server by accessing to the WWW server through the network, for converting the obtained data into image data which can be print processed, and for printing the image data, and the operation of the printing function is controlled on the basis of an operating instruction regarding the printing function supplied from the information processing terminal through the network.

Further, in the image forming apparatus, the printing function comprises: data obtaining means for accessing to the WWW server and obtaining the data held in the WWW server; image data forming means for forming image data from the data obtained by the data obtaining means; and printing means for printing the image data formed by the image data forming means.

Further, in the image forming apparatus, the operating instruction includes an instruction of print parameters such as a URL and the like, an activating instruction, and a stop instruction for the WWW server.

According to the invention, there is provided an image forming apparatus for printing data held in a WWW server on a network, wherein the apparatus has a printing function for obtaining the data held in the WWW server by accessing to the WWW server through the network, for converting the obtained data into image data which can be print processed, and for printing the image data, and the apparatus has reserving means for reserving an execution of a job using the printing function.

Further, the image forming apparatus comprises: timer means for starting a counting operation from a time point when the reservation of the job by the reserving means occurs; and reservation cancelling means for cancelling the reservation of the job when the job reserved by the reserving means is not executed at a time point when the timer means counts a predetermined time.

Further, the image forming apparatus also comprises notifying means for notifying the user who reserved the job of a fact that an executing order of the job reached when the executing order of the job reserved by the reserving means comes.

Further, the image forming apparatus comprises: weighting means for adding a weight to the job when the job is reserved by the reserving means; and rearranging means for rearranging the executing order of the reserved job in accordance with the value weighted by the weighting means.

Further, the image forming apparatus comprises notifying means for notifying the user who reserved the job of an execution result of the job reserved by the reserving means.

Further, in the image forming apparatus, the reserving means accepts the reservation of the job using the printing function outputted through the network from the information processing terminal connected to the network.

Further, in the image forming apparatus, reservation data including print parameters such as a URL and the like and a print time for the WWW server is used for the reservation of the job using the printing function.

According to the invention, there is provided a printing apparatus for accessing and printing hyper text data on a network, comprising: registering means for registering address information and access frequency information on the network in the hyper text data as an access target; accessing means for periodically accessing the hyper text data existing at a location shown by the address information regarding the registration in accordance with the access frequency information registered by the registering means; and print control means for printing the hyper text data accessed by the accessing means.

In each of the registering means, registering step, and registering routine of the invention, the number of days and the time have been registered as access frequency information.

In each of the registering means, registering step, and registering routine of the invention, the day of the week and the time have been registered as access frequency information.

In each of the registering means, registering step, and registering routine of the invention, the day of the month and the time have been registered as access frequency information.

The accessing means, accessing step, and accessing routine of the invention respectively include calculating means, step, and routine for sequentially calculating the actual access day and time on the basis of the access frequency information registered by the registering means, step, and routine, and the access is performed at a time point when the access day and time calculated by the calculating means, step, and routine reach.

The accessing means, accessing step, and accessing routine of the invention include display control means, step, and routine for displaying the access day and time calculated by the calculating means, step, and routine as next access scheduled day and time.

Each of the accessing means, accessing step, and accessing routine of the invention requests a data transmission only in the case where the previous hyper text data has been updated.

In the case where the hyper text data cannot be received at the time of the present access because the previous hyper text data is not updated, each of the print control means, print control step, and print control routine of the invention allows message data indicative of such a fact to be printed.

Each of the print control means, print control step, and print control routine of the invention adds the address information and the access day/time information to the hyper text data as header information or footer information and prints.

Each of the print control means, print control step, and print control routine of the invention adds the address information and the access day/time information to the hyper text data as front cover information and prints.

The network of the invention is constructed by the internet.

The hyper text data of the invention is data provided by the WWW server on the internet.

Each of the registering means, registering step, and registering routine of the invention registers a plurality of sets of the address information and the access frequency information.

As access frequency information in the plurality of sets of the address information and the access frequency information, each of the registering means, registering step, and registering routine of the invention registers so that the actual access days and times do not coincide.

Each of the registering means, registering step, and registering routine of the invention registers a key word and the number of links together with the address information and the access frequency information, and each of the accessing means, accessing step, and accessing routine accesses by requesting so that the hyper text data regarding the hyper text data shown by the address information is also searched within a range of the number of links on the basis of the key word.

BRIEF DESCRIPTION OF THE DRAWINGS

FIG. 11 is a diagram showing an example of an operation picture plane of the print utility in the client 9 in FIG. 1;

FIG. 12 is a diagram showing an example of a construction of a control file which is transmitted from the print utility of the client 9 in FIG. 1 to a digital copier 1;

FIGS. 13A, 13B and 13C are diagrams showing formats after conversion of an LPR command (FIG. 13A)/an LPQ command (FIG. 13B)/an LPRM command (FIG. 13C) in response to a Web Pull Print request/a job information request/a job cancel request from the print utility of the client 9 in FIG. 1, respectively;

FIG. 26 is a diagram showing an example of an operation picture plane of the Web print mode which is displayed in the operation unit;

FIG. 36 is a diagram showing a print example of a hyper text in the case where the URL information and access day/time information are added as display information;

FIG. 38 is a diagram showing an example of a print of a message indicative of the absence of a data updating in the second embodiment.

DETAILED DESCRIPTION OF THE PREFERRED EMBODIMENTS

Embodiments of the present invention will now be described hereinbelow with reference to the drawings.

(First Embodiment)

Figure 1:
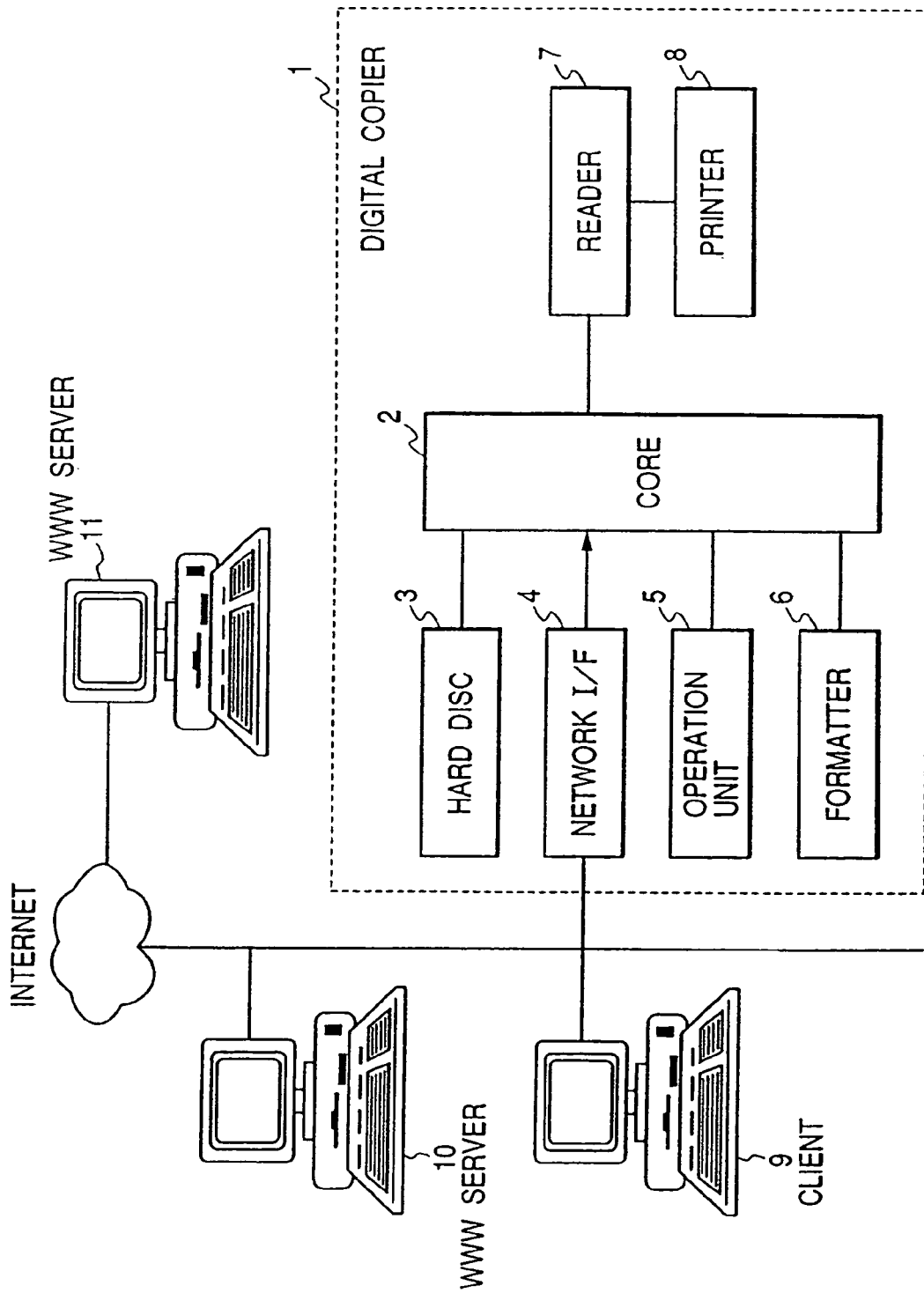
FIG. 1 is a block diagram showing a construction of the first embodiment of an image forming apparatus of the invention.

FIG. 1 is a block diagram showing a construction of the first embodiment of an image forming apparatus of the invention. In the embodiment, an image forming apparatus comprising a digital copier will be explained as an example.

As shown in FIG. 1, a digital copier 1 comprises a reader 7, a printer 8, and a core 2. The reader 7 reads an image of an original and outputs image data according to the original image to the printer 8 and core 2. The printer 8 records the image according to the image data from the reader 7 and core 2 onto a recording paper. The core 2 connects the reader 7 and also connects a hard disc 3, a network interface (hereinafter, referred to as a network I/F) 4, an operation unit 5, and a formatter 6.

The hard disc 3 stores various control programs, image data, and the like.

The network I/F 4 has an interface to connect the core 2 to a network. The network comprises an intranet. A client 9 and an intranet WWW server 10 are connected to the intranet and are connected to the internet network. An extremely large number of internet WWW servers 11 exist in the internet network. Each of the WWW servers 10 and 11 opens a homepage. In the digital copier 1 in the embodiment, information of the homepage can be obtained from each of the WWW servers 10 and 11 through the network I/F 4.

The operation unit 5 has various keys for performing the inputting operation regarding the setting of each function mode in the digital copier 1 and a display unit to display a setting state.

The formatter 6 converts code data showing an image which is transferred from a computer connected to the network I/F 4 into image data of a format which can be printed by the printer 8.

As will be explained hereinlater with respect to the core 2, the core 2 controls a flow of data among the blocks of the reader 7, printer 8, hard disc 3, network I/F 4, operation unit 5, and formatter 6.

Figure 31:
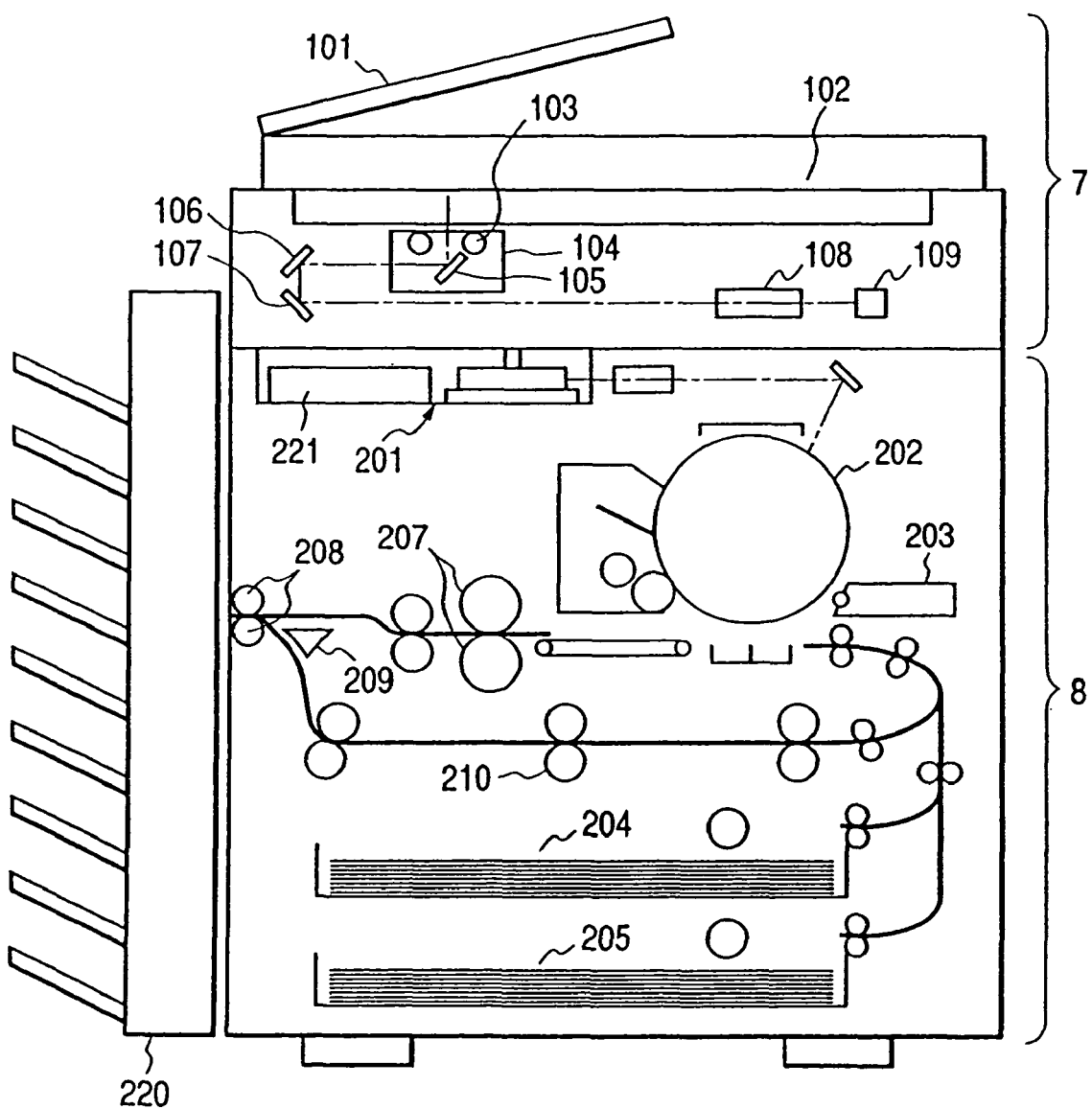
FIG. 31 is a cross sectional view showing a construction of an image input/output device in which a reader 7 and a printer 8 are integratedly provided.

Constructions of the reader 7 and printer 8 will now be described with reference to FIG. 31. FIG. 31 is a cross sectional view showing a construction of the image input/output device in which the reader 7 and printer 8 are integratedly provided.

As shown in FIG. 31, a document feeder 101 is installed in the reader 7. The document feeder 101 is constructed in a manner such that originals are sequentially fed one by one from the last page onto a platen glass 102 and, after completion of the reading operation of the original, the original on the platen glass 102 is ejected.

When the original is conveyed onto the platen glass 102, a lamp 103 is lit on and the movement of a scanner unit 104 is started. The original is exposed and scanned by the movement of the scanner unit 104. The reflection light from the original at the time of exposure scan is led to a CCD image sensor (hereinafter, abbreviated to a CCD) 109 through mirrors 105, 106, and 107 and a lens 108. The image of the original scanned as mentioned above is read by the CCD 109. The CCD 109 converts the image which was optically read into image data by a photoelectric conversion and outputs. The image data outputted from the CCD 109 is subjected to predetermined processes. After that, the processed image data is transferred to the printer 8 and core 2 through a video bus (not shown).

The printer 8 inputs the image data outputted from the reader 7 to a laser driver 201. The laser driver 201 drives a laser light emitting unit 221 on the basis of the inputted image data. That is, the laser light emitting unit 221 is driven so as to emit the laser beam according to the image data outputted from the reader 7. The laser beam is irradiated onto a photosensitive drum 202 while being scanned, so that an electrostatic latent image according to the laser beam is formed on the photosensitive drum 202.

The electrostatic latent image of the photosensitive drum 202 is visualized as a developing agent image by a developing agent which is supplied from a developing unit 203. At a timing synchronized with the start of the irradiation of the laser beam, a recording paper is fed from either one of cassettes 204 and 205. The recording paper is conveyed to an interval between the photosensitive drum 202 and a transfer unit 206. The developing agent image formed on the photosensitive drum 202 is transferred onto the conveyed recording paper by the transfer unit 206.

The recording paper onto which the developing agent image has been transferred is conveyed to a fixing unit 207. The fixing unit 207 fixes the developing agent image onto the recording paper by heating the recording paper with a pressure. The recording paper which passed through the fixing unit 207 is ejected by ejection rollers 208. A sorter 220 encloses the ejected recording papers onto bins, thereby sorting the recording papers, respectively. The sorter 220 operates so as to enclose the recording papers onto the top bin when a sorting mode is not set. When a both-sided recording mode is set, the recording paper is conveyed to the position of the ejection rollers 208 and, after that, the rotating direction of the ejecting rollers 208 is reversed, thereby guiding the recording paper to a paper re-feed conveying path 210 by a flapper 209. When a multiple recording mode is set, the flapper 209 is switched so as not to convey the recording paper to the ejection rollers 208, thereby guiding it to the paper re-feed conveying path 210. The recording paper guided to the paper re-feed conveying path 210 is again fed to the interval between the photosensitive drum 202 and the transfer unit 206 at the foregoing timing.

Figure 2:
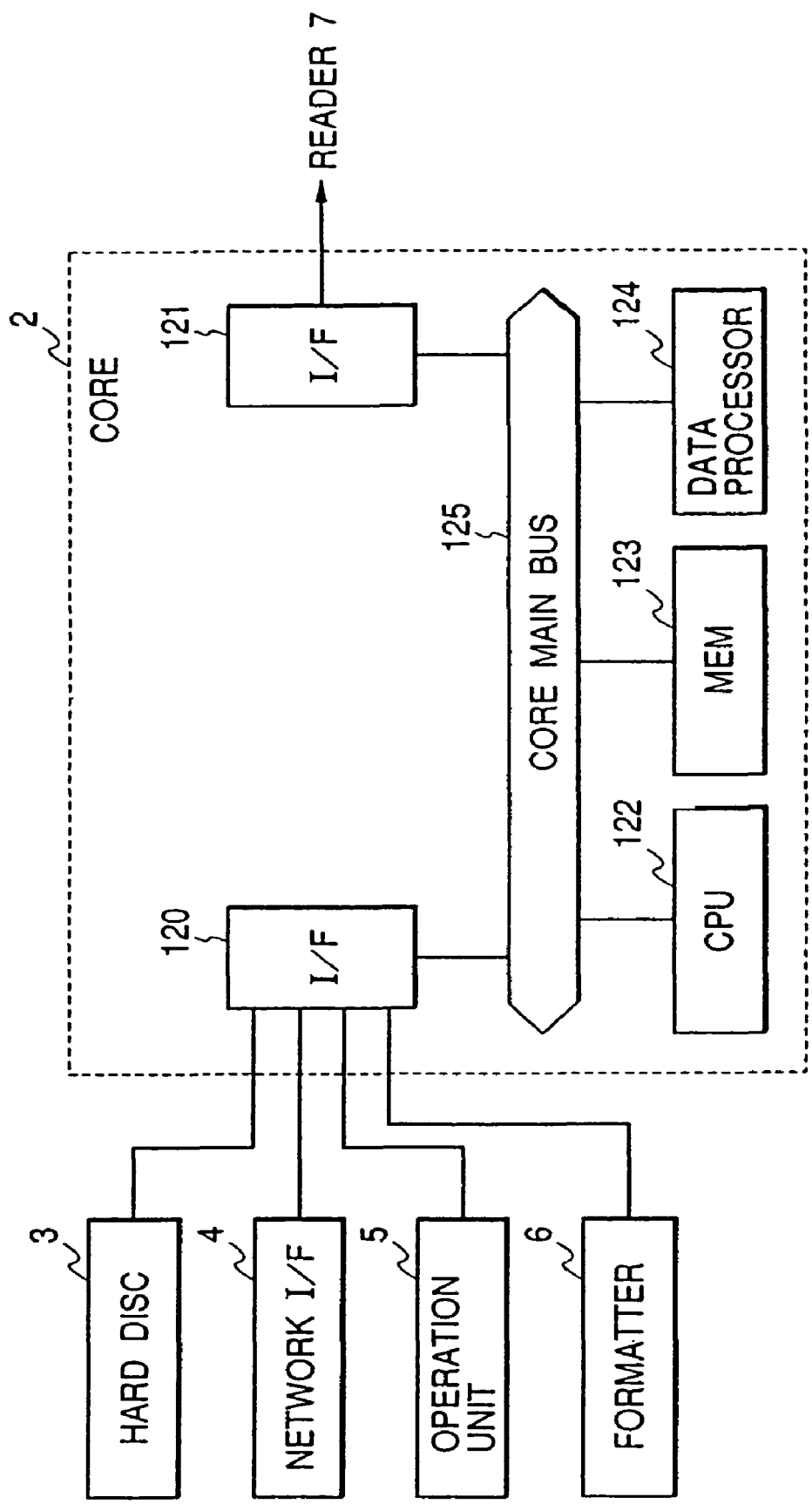
FIG. 2 is a block diagram showing a construction of a core 2 in the image forming apparatus of FIG. 1.

A construction of the core 2 will now be described with reference to FIG. 2. FIG. 2 is a block diagram showing a construction of the core 2 of the image forming apparatus of FIG. 1.

The core 2 has an I/F 121 with the reader 7. The image data transferred from the reader 7 is transmitted to a data processor 124 through the I/F 121 and a core main bus 125. A control command from the reader 7 is transferred to a CPU 122. The data processor 124 executes image processes such as rotating process, zooming process, and the like of the image to the inputted image data as necessary. The image data which was image processed by the data processor 124 is transferred to the hard disc 3 and network I/F 4 through an I/F 120 in response to the control command supplied from the reader 7.

Code data showing the image inputted from the client 9 through the network I/F 4 is transferred to the data processor 124 and, after that, it is transmitted to the formatter 6 and developed to the image data. The image data is transferred to the data processor 124 and, thereafter, is sent to the printer 8 through the I/F 121.

The CPU 122 executes a transfer control of data between the blocks in accordance with a control program stored in a memory 123 and the control command sent from the reader 7 and controls the execution of the image processes by the data processor 124. The memory 123 is also used as a work area of the CPU 122.

As mentioned above, processes in which the functions such as reading of the original image, printing of the image, input and output of data to/from the computer, and the like are combined can be executed around the core 2 as a center.

Figure 3:
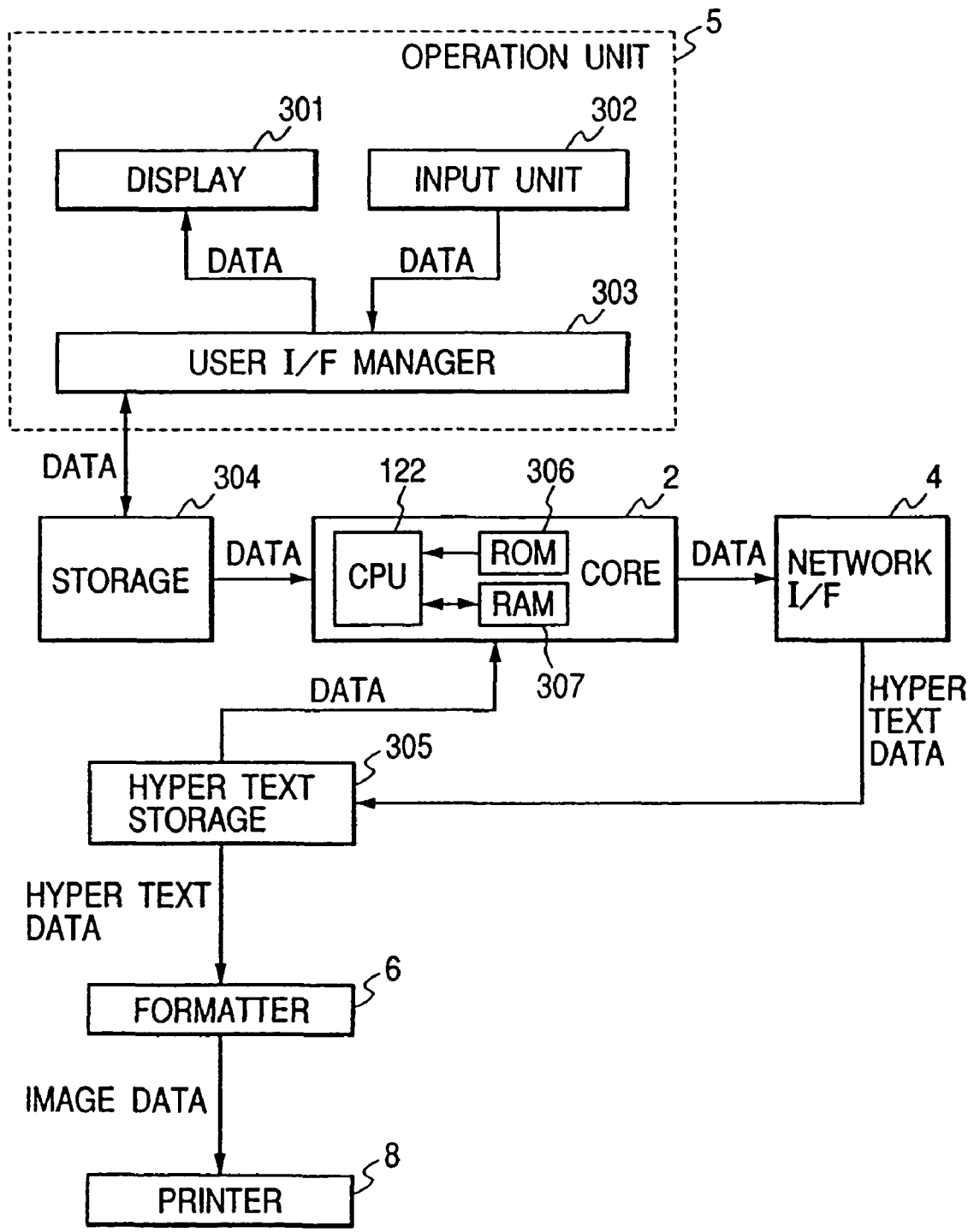
FIG. 3 is a block diagram showing a schematic construction of a copier to which the image forming apparatus according to the embodiment of the invention is applied.

FIG. 3 is a block diagram showing a schematic construction of a copier to which the image forming apparatus according to the embodiment of the invention is applied. The same component elements as those described in the foregoing drawings are designated by the same reference numerals.

The copier is connected to the network such as an internet or the like through the network I/F 4 and has a function for automatically and periodically accessing and printing an information resource (hyper text) on the network.

As shown in FIG. 3, in addition to the network I/F 4, the copier has a display 301, an input unit 302, a user I/F manager 303, a storage 304, a hyper text storage 305, the formatter 6 by a PDL (Page Description Language), the printer 8, and the core 2. The display 301, input unit 302, and user I/F manager 303 correspond to the operation unit 5 described in FIG. 1.

In the embodiment, the display 301 is constructed by, particularly, a liquid crystal display device and is used to perform an input guidance or the like of address information of a URL (Uniform Resource Location) or the like of the hyper text on the network and access frequency information for the hyper text. The input unit 302 is formed in a touch panel region of the liquid crystal display device. In the embodiment, particularly, the input unit 302 is used to input a command for designating the URL information or a command for designating the access frequency information. The URL information and access frequency information inputted by the input unit 302 are registered into the storage 304.

The user I/F manager 303 has a function for receiving the command from the input unit 302, storing the data into the storage 304, and supplying the data stored in the storage 304 to the display 301. The hyper text storage 305 has a function for storing the hyper text data which is supplied from the network I/F 4, storing the URL information of the hyper text data and the access information such as access day and time and the like, and managing.

The formatter 6 has a function for developing the data stored in the hyper text storage 305 to image data (bit map data) which can be recorded by the printer 8 and supplying to the printer 8.

The core 2 has communicating means for communicating among the data storage 304, hyper text storage 305, and network I/F 4, has a function for referring to the data in the data storage 304, a function for requesting the network I/F 4 to obtain the hyper text data on the server, a function for requesting the formatter 6 to output the image data to the printer 8, and the like, and also performs a whole control of the apparatus.

The core 2 has the CPU 122, an RAM 307, and an ROM 306. Programs corresponding to flowcharts of FIGS. X3 to X5, X8, and X10 have been stored in the ROM 306. The CPU 122 executes the programs in the ROM 306 while using the RAM 307 as a work area or the like.

Figure 4:
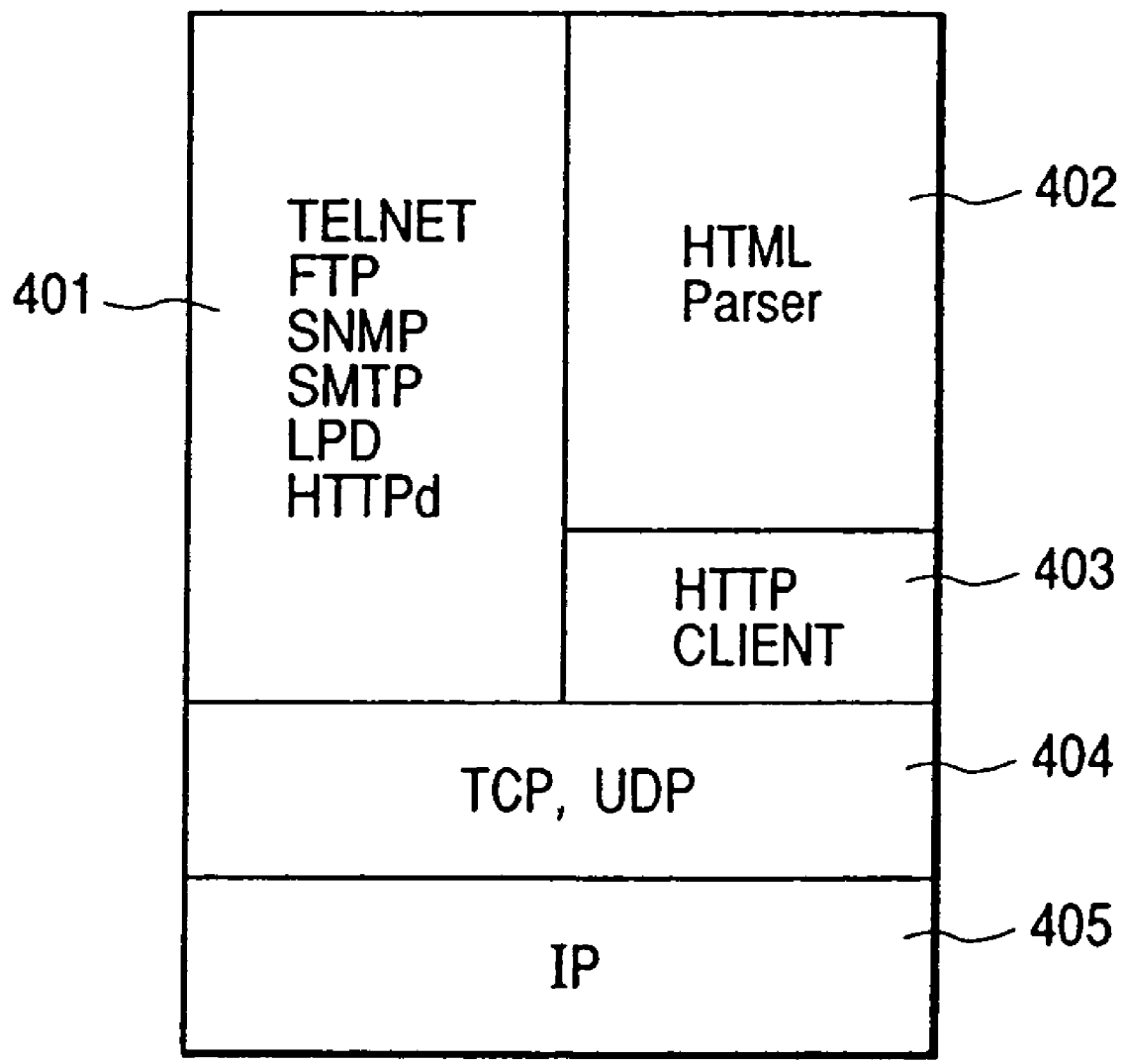
FIG. 4 is a diagram showing a program construction in a network I/F in the image forming apparatus of FIG. 1.

A program construction in the network I/F 4 will now be described with reference to FIG. 4. FIG. 4 is a diagram showing the program construction in the network I/F of the image forming apparatus of FIG. 1.

As shown in FIG. 4, the program in the network I/F 4 comprises an IP (Internet Protocol) 405, a TCP (Transmission Control Protocol)/UDP (User Datagram Protocol) 404, a protocol 401 of an application layer, and a plurality of applications.

The IP 405 is a protocol layer of the internet to provide a service for sending a message from a transmitting host to a receiving party host while interlocking with a relay node such as a router or the like. The most important information to send the message is a transmitting address and a receiving party address. The transmitting address and the receiving party address are managed by the IP 405. A routing to send the message to the receiving party host by using which path in the internet network in accordance with the address information is performed by the IP 405.

The TCP/UDP 404 is a transport layer to provide a service for sending a message from a transmitting application process to a receiving application process. The TCP is a connection type service and guarantees the advanced reliability of the communication. However, the UDP is a connectionless type service and does not guarantee the reliability.

The protocol 401 of the application layer specifies a plurality of protocols. In this protocol, a TELNET as a remote log-in service, an FTP as a file transfer service, an SNMP as a network managing protocol, an LPD as a server protocol for printing by the printer, an HTTPd as a protocol of a WWW (World Wide Web) server, and the like exist.

As applications, an HTTP client 403 to obtain data of the WWW server and an HTML Parser 402 to convert the data of the HTML format and image data which were obtained into a data format to be printed onto the recording paper are provided.

In the embodiment, the digital copier 1 has a function for actively accessing to the WWW server, obtaining the data of the HTML format in the WWW server, and printing by the self printer 8. Hereinafter, this function is called a Web Pull Print. A request of the Web Pull Print to the digital copier 1 by the user is performed through a dedicated program (hereinafter, referred to as a print utility) which operates on the client 9. The print utility is a program for performing various settings with respect to the Web Pull Print and transmitting the set contents to the digital copier 1 by using a packet, which will be explained hereinlater. The digital copier 1 which receive the packet analyzes the contents of the packet and starts the Web Pull Print operation in accordance with the instruction contents.

The digital copier 1 has a function for spooling a plurality of Web Pull Print requests received from the print utility in a form of a job. The print utility can communicate with the digital copier 1 by using a packet, which will be explained hereinlater, obtain information regarding the jobs spooled in the digital copier 1, or cancel a specific job.

Items which can be set by the user by using the print utility will now be described with reference to Table 1. Table 1 shows a list of the items which can be set by using the print utility.

TABLE 1

| No. | Set items | Set contents | Default value |
|---|---|---|---|
| 1 | Print document title | Character train | None |
| 2 | URL | Character train | None |
| 3 | Printer address | Character train | None |
| 4 | User name | Character train | None |
| 5 | Option file | Character train | Default. hpi |
| 6 | Link level | 0 to 10 | 0 |
| 7 | The max. number of print pages | 0 to 100 | 0 |
| 8 | Print over the max. number of print pages | YES/NO | YES |
| 9 | Print of another site | YES/NO | NO |
| 10 | Print of link map | YES/NO | NO |
| 11 | Print of page No. | YES/NO | YES |
| 12 | Print of date | YES/NO | YES |
| 13 | Print of URL | YES/NO | YES |
| 14 | Print of document title | YES/NO | YES |
| 15 | Contents of header to be printed | Character train | None |
| 16 | Location of header to be printed | right/center/left | right |
| 17 | Print of background | YES/NO | NO |
| 18 | Number to <H> tag | YES/NO | NO |
| 19 | Print link document first | YES/NO | NO |
| 20 | Enlargement magnification/reduction magnification | 50 to 200 | 100 |
| 21 | Reduction magnification at the time of page boundary | 20 to 100 | 100 |
| 22 | Font name | Character train | None |
| 23 | Font size | small/medium/large | Medium |
| 24 | Thickness of font | hold/regular/light | Regular |
| 25 | Use of style sheet | YES/NO | NO |
| 26 | Style sheet name | Character train | None |
| 27 | Print paper size | Letter/Legal/11 x 7/Statement/A3/A4/A5/B4/B5 | Letter |
| 28 | Orientation of print paper | Portrait/Landscape | Portrait |
| 29 | Left/right/top/bottom margin | 0 to 10 | 1 |
| 30 | Print quantity | 1 to 99 | 1 |
| 31 | Sorter | none/normal/staple/group | None |
| 32 | Resolution | 300/400/600 | 600 |
| 33 | Both-sided print | YES/NO | NO |
| 34 | Setting of Scheduled print | no/once/weekly/monthly/repeat | NO |
| 35 | Designation of day of the week | Sunday/Saturday | None |

TABLE 1-continued

| No. | Set items | Set contents | Default value |
|---|---|---|---|
| 36 | Designation of date | Year/month/day | None |
| 37 | Designation of time | Hour/min. | None |
| 38 | Print of only updated document | YES/NO | NO |

The contents of each item are as follows.

(1) "Print Document Title"

A document title which is printed in the header portion of the print result. The user can also edit it.

(2) "URL"

A domain name of the WWW server in which the homepage which the user wants to print has been stored and a file name of the data of the HTML format to be obtained are designated.

(3) "Printer Address"

A network address of the digital copier 1 to send the Web Pull Print request.

(4) "User Name"

An arbitrary user name can be inputted. The digital copier 1 specifies a sender of the Web Pull Print request from the user name.

(5) "Option File"

A file in which all of the contents set by the present print utility have been preserved. An option file of each user is preliminarily formed. By designating any one of the files by the set item, it is possible to set in a lump for all of the set items.

(6) "Link Level"

In the digital copier of the embodiment, in the case where a hyper link has been set in the homepage whose printing was designated, the homepage of the link destination can be also printed by tracing back the link. In this instance, the layer to which the link is traced back is designated by this item.

(7) "The Max. Number of Print Pages"

When the homepage to be printed exists on a plurality of pages, an upper limit value of the number of pages which are printed.

(8) "Print Over the Max. Number of Print Pages"

When one homepage to be printed exists on a plurality of pages and a halfway page corresponds to (7) "The max. number of print pages", whether the printing is performed up to the end of the homepage or not is designated.

(9) "Print of Another Site"

When the level in the designation of "Link level" of the above set item (6) is equal to or higher than "1" and the link destination is another site, whether the link destination is also printed or not is designated.

(10) "Print of Link Map"

In the digital copier of the embodiment, a link map showing a link relation when the homepage is printed while tracing back the link can be formed and printed. Whether the link map is printed as a final page of the print of the homepage or not is designated.

(11) "Print of Page No."

Whether the page number is printed in the footer portion of the print result or not is designated.

(12) "Print of Date"

Whether the print execution date is printed in the footer portion of the print result or not is designated.

(13) "Print of URL"

Whether the URL is printed in the footer portion of the print result or not is designated.

(14) "Print of Document Title"

Whether the "document title" of the set item (1) is printed in the header portion of the print result or not is designated.

(15) "Contents of Header to be Printed"

An arbitrary character train which is printed in the header portion of the print result.

(16) "Location of Header to be Printed"

The location where the character train designated by the "Contents of header to be printed" of the set item (15) is printed.

(17) "Print of Background"

In the case where an image for drawing a background has been designated in the homepage, whether it is printed or not is designated. This mode is set in order to prevent a situation such that in the case where black or the like has been set as a background color of the homepage, even if there is no problem when displaying on a color display, so long as it is printed by a black and white printer, a text portion becomes black and the background also becomes black, so that the text cannot be discriminated.

(18) "Numbering to <H> Tag"

Whether the title number is added to the head of a title sentence in the homepage or not is designated.

(19) "Print Link Document First"

When two or more link levels are designated, whether the printing is performed in accordance with the order of the links which were read out or the printing of the same link level is first performed is designated.

(20) "Enlargement Magnification/Reduction Magnification"

An enlargement magnification/reduction magnification when the homepage is enlarged/reduced and printed.

(21) "Reduction Magnification at the Time of Page Boundary"

In the digital copier of the embodiment, when the image on the homepage exists at a page boundary, the image can be reduced and printed so as to be enclosed in the page. The reduction magnification in this instance is designated.

(22) "Font Name"

A font which is used when the HTML text data is printed.

(23) "Font Size"

Font size which is used when a title character train in the homepage is printed.

(24) "Thickness of Font"

A thickness of font which is used when the title character train in the homepage is printed.

(25) "Use of Style Sheet"

Whether the file designated by the "style sheet name" of the following set item (26) is used or not is designated.

(26) "Style Sheet Name"

In the case where the file (style sheet) in which the set contents of "Font name" of the item (22), "Font size" of (23), and "Thickness of font" of (24) have been stored preliminarily exists, its file name is designated. Thus, the user can perform the setting regarding those fonts without setting the individual items.

(27) "Print Paper Size"

A size of paper which is used when printing.

(28) "Orientation of Print Paper"

Either Portrait or Landscape is designated as an orientation of the paper when printing.

(29) "Left/Right/Top/Bottom Margin"

Margins from the paper edges when printing.

(30) "Print Quantity"

A plurality of papers can be printed by setting this item.

(31) "Sorter"

The operating mode of the sorter connected to the digital copier of the embodiment is designated. In the operating mode, there are a normal sort, a staple sort, and a group sort. By selecting the normal sort, printed matters of a plurality of sets are sorted every set for each bin of the sorter (220 in FIG. 31) and are ejected. When the staple sort is selected, the sorted printed matters are bounded by using a stapler. When the group sort is selected, the originals of a plurality of sets are printed in a manner such that the printed matters of the same page are ejected to the same bin.

(32) "Resolution"

Print resolution.

(33) "Both-Sided Print"

Whether the both-sided printing is performed or not is designated.

(34) "Setting of Scheduled Print"

In the digital copier of the embodiment, the Web Pull Print operation can be started at the designated time or the Web Pull Print request from the user can be periodically repeated. Specifically speaking, there are five modes of an instant executing mode, a time designating mode, a periodic accessing mode (designation of day of the week), a periodic accessing mode (designation of date), a periodic accessing mode (designation of period). In this item, any one of the modes is designated.

(35) "Designation of Day of the Week"

When the periodic accessing mode (designation of day of the week) is designated by "Setting of scheduled print" of the set item (34), the day of the week for execution is designated.

(36) "Designation of Date"

When the periodic accessing mode (designation of date) is designated by "Setting of scheduled print" of the set item (34), the date for execution is designated. When the periodic accessing mode (designation of period) is designated, the execution time period is designated by the day.

(37) "Designation of Time"

When the time designating mode is designated by "Setting of scheduled print" of the set item (34), the time for execution is designated. When the periodic accessing mode (designation of period) is designated, the execution time period is designated.

(38) "Print of Only Updated Document"

When executing in the periodic accessing mode, whether only the homepage updated after the previous printing is printed or not is designated.

An operation picture plane of the print utility in the client 9 will now be described with reference to FIGS. 5 to 11. FIGS. 5 to 11 are diagrams showing examples of the operation picture plane of the print utility in the client 9 in FIG. 1.

Figure 5:
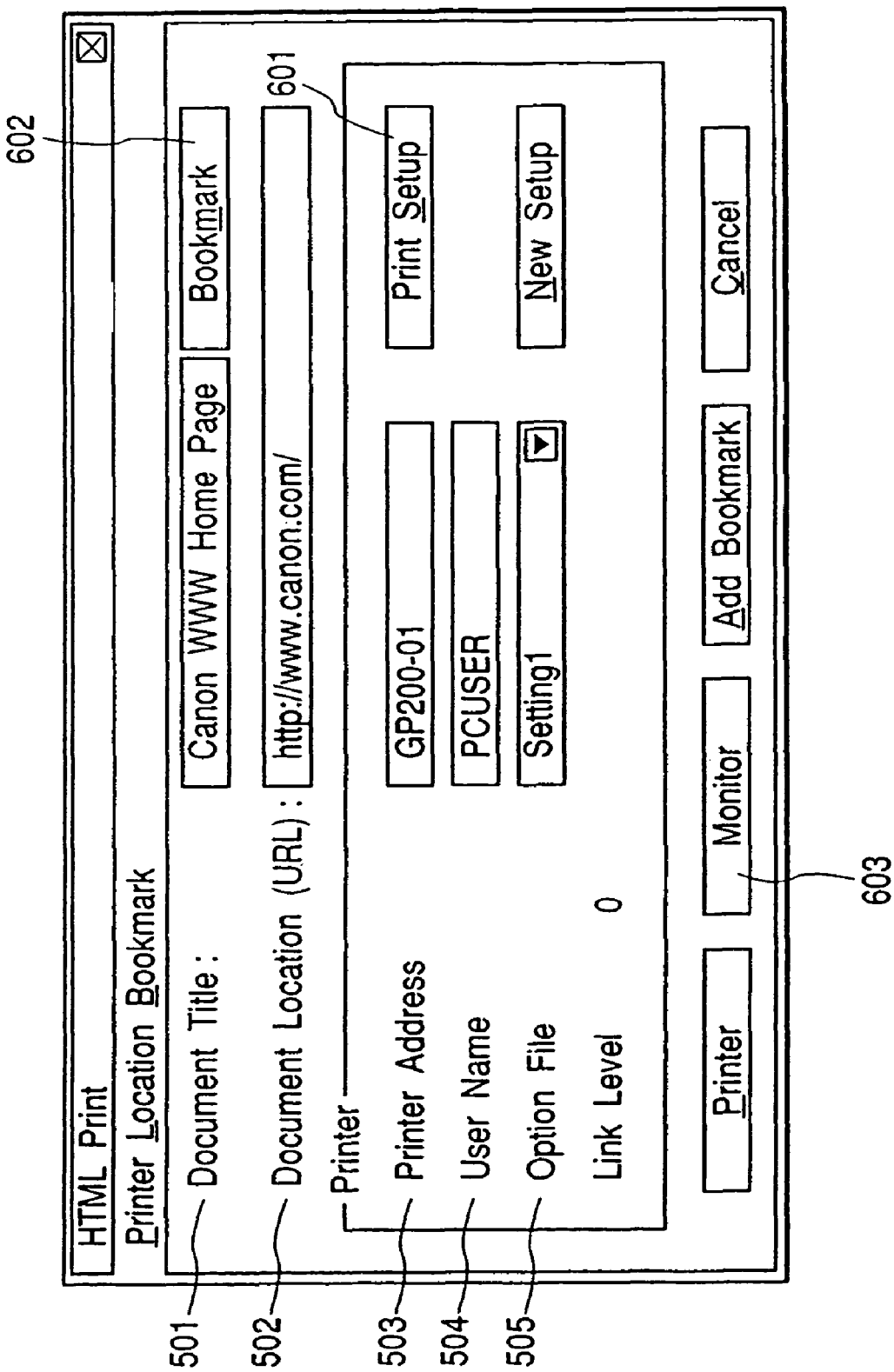
FIG. 5 is a diagram showing an example of an operation picture plane of a print utility in a client 9 in FIG. 1.
Figure 6:
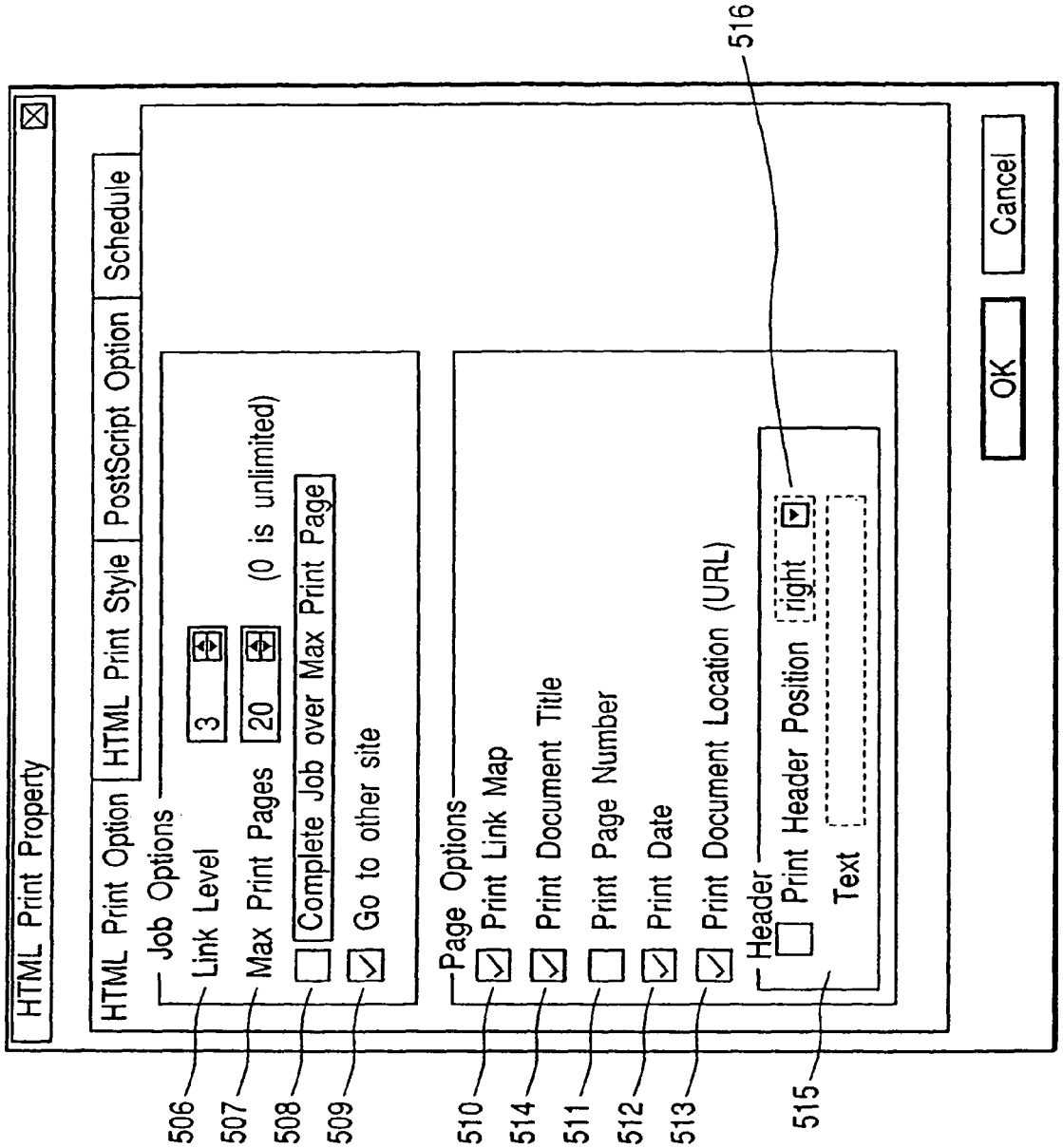
FIG. 6 is a diagram showing an example of an operation picture plane of the print utility in the client 9 in FIG. 1.
Figure 7:
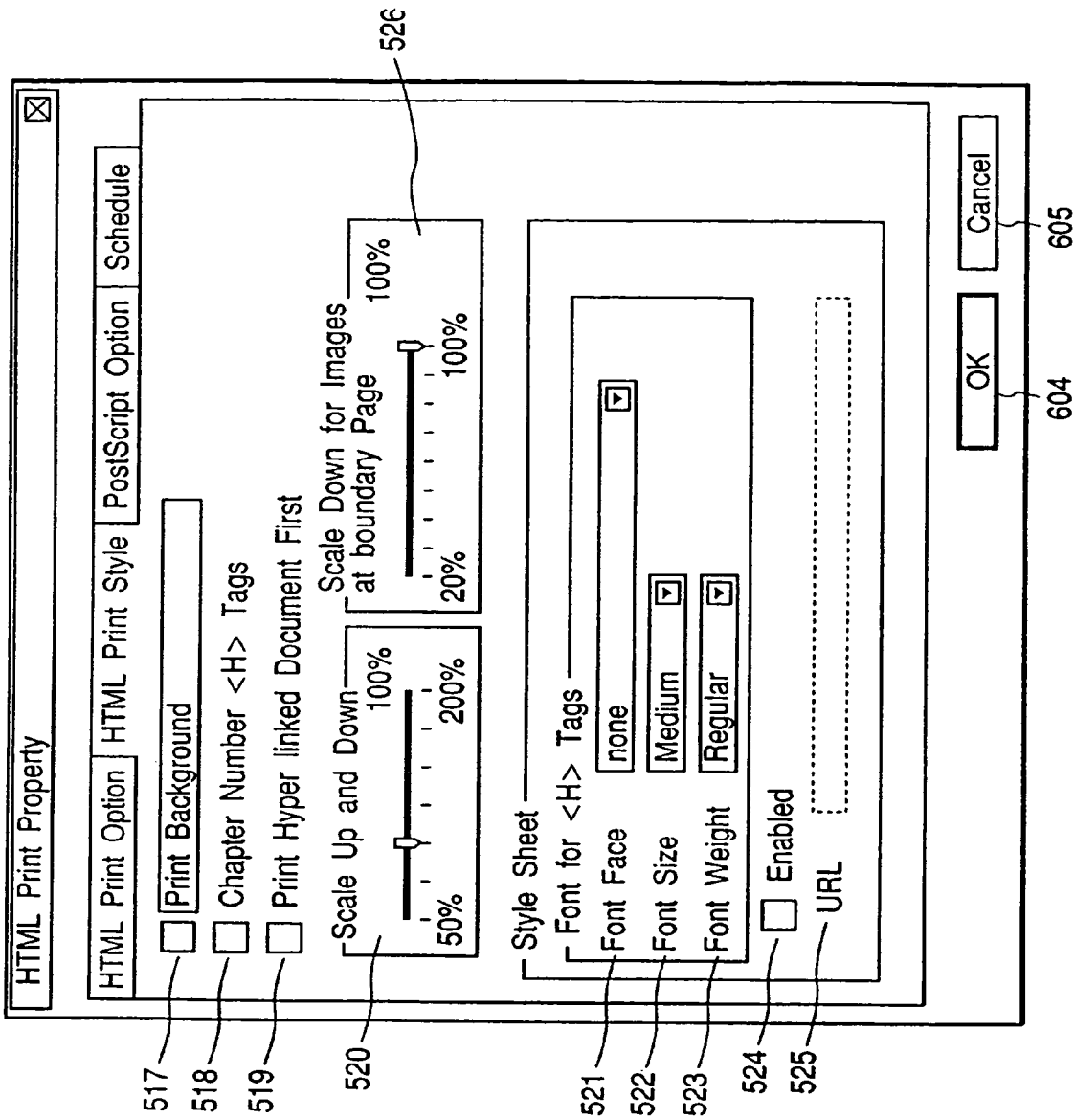
FIG. 7 is a diagram showing an example of an operation picture plane of the print utility in the client 9 in FIG. 1.
Figure 8:
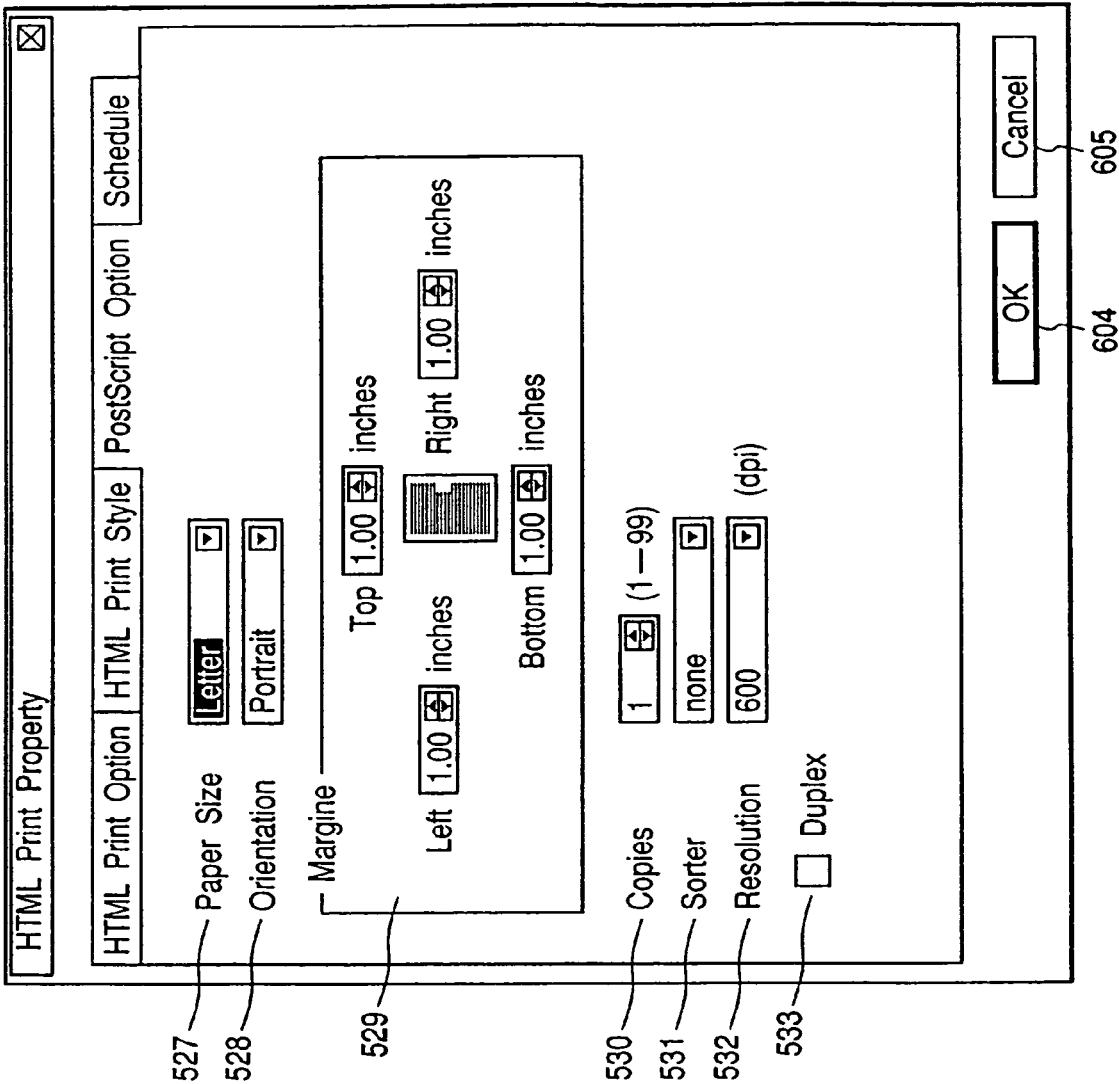
FIG. 8 is a diagram showing an example of an operation picture plane of the print utility in the client 9 in FIG. 1.
Figure 9:
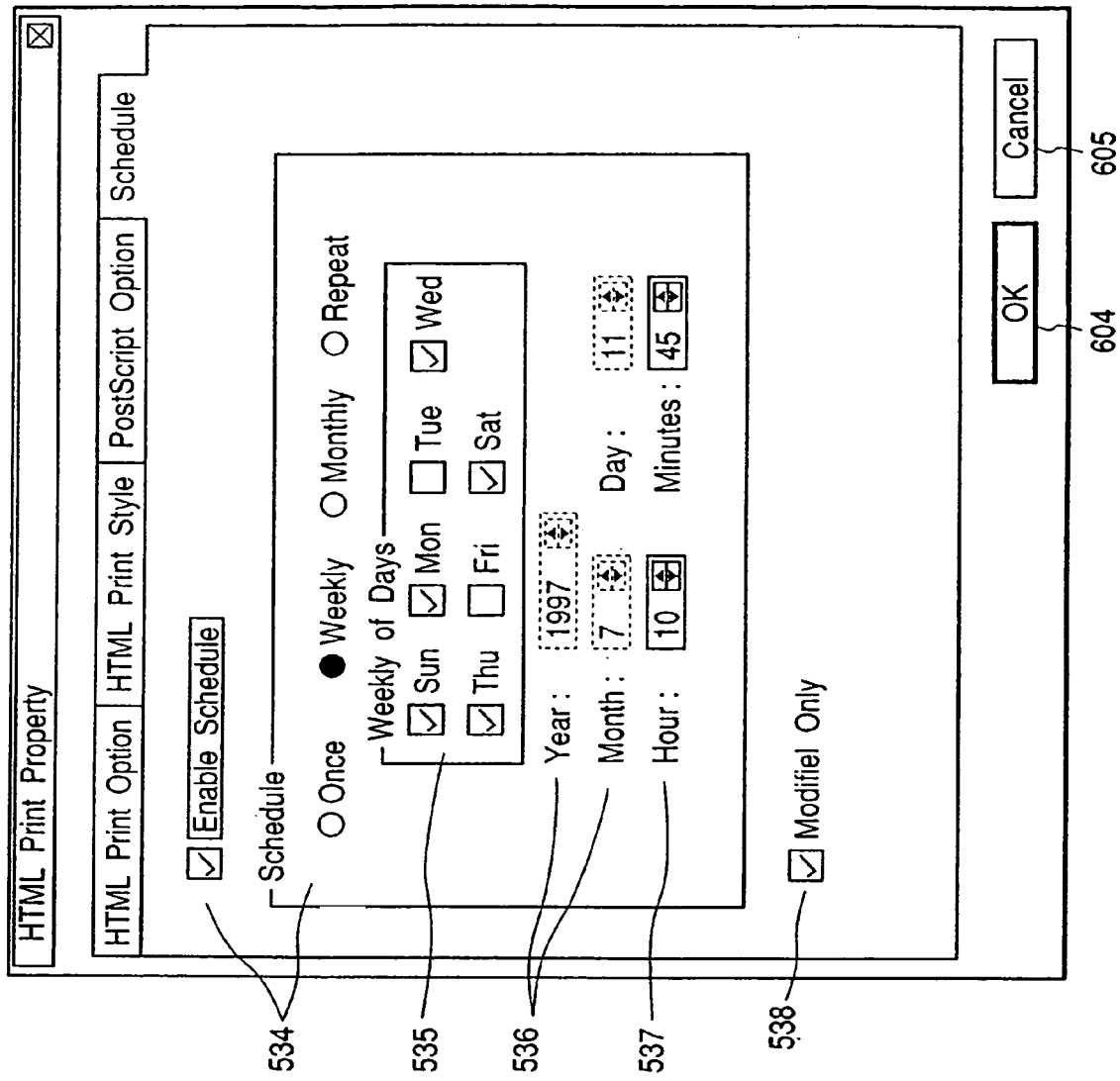
FIG. 9 is a diagram showing an example of an operation picture plane of the print utility in the client 9 in FIG. 1.

When the print utility is activated on the client 9, the operation picture plane shown in FIG. 5 is first displayed in the display 301. Input columns 501 to 505 corresponding to the set items (1) to (5) are displayed on the operation picture plane. In case of setting the set items (6) to (38), by pressing a "Print Setup" button 601 on the operation picture plane, the operation picture plane of FIG. 6 is newly displayed. On this operation picture plane, input columns 506 to 516 corresponding to the set items (6) to (16) are displayed. By further pressing tags "HTML Print Style", "Post Script Option", and "Schedule" in the upper portion of the operation picture plane, the screen can be moved to the operation picture plane shown in each of FIGS. 7 to 9. On the operation picture plane shown in FIG. 7, input columns 517 to 526 corresponding to the set items (17) to (26) are displayed. On the operation picture plane shown in FIG. 8, input columns 527 to 533 corresponding to the set items (27) to (33) are displayed. On the operation picture plane shown in FIG. 9, input columns 534 to 538 corresponding to the set items (34) to (38) are displayed. By pressing an "OK" button 604 and a "Cancel" button 605 on the operation picture planes of FIGS. 6 to 9, the screen can be returned to the operation picture plane of FIG. 5.

Figure 10:
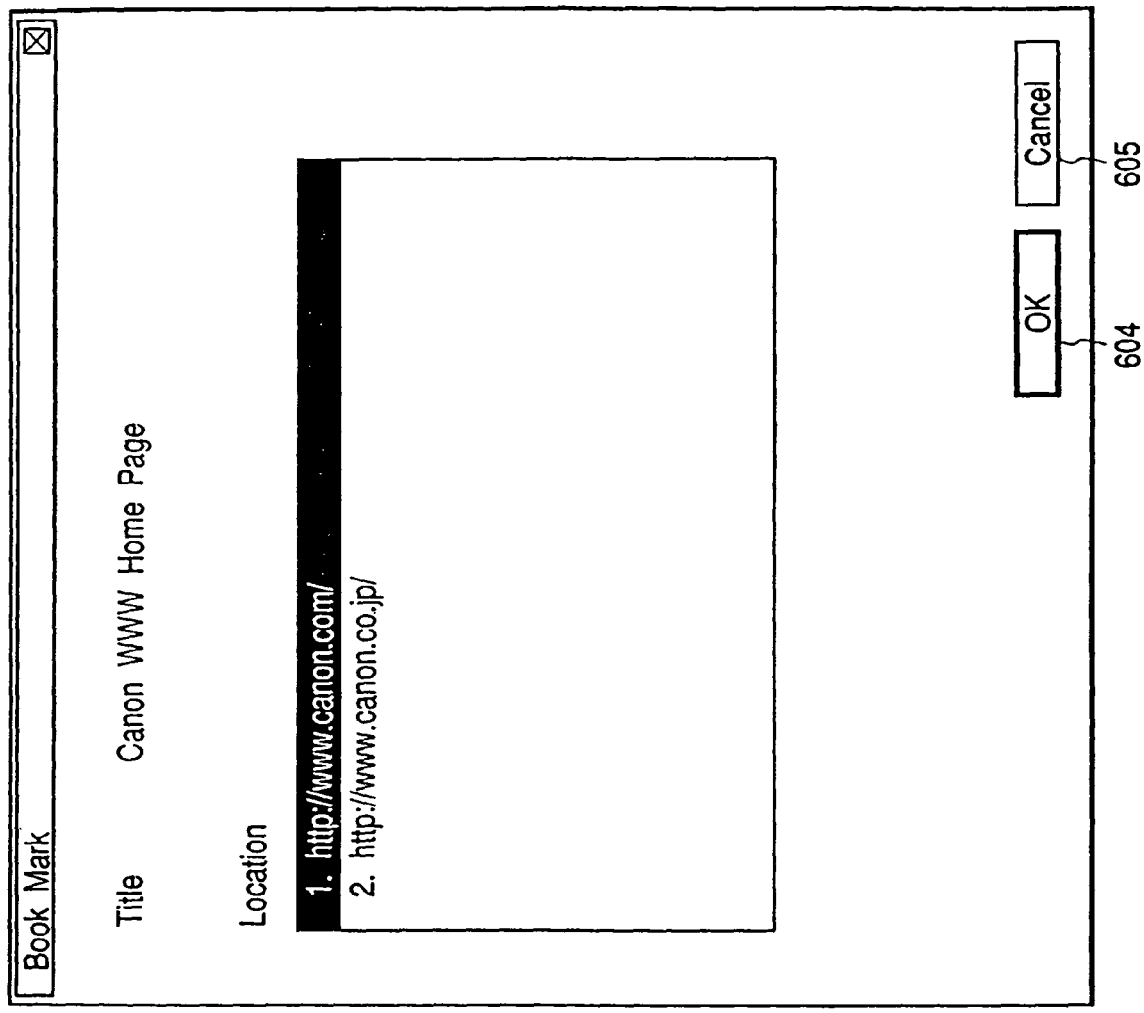
FIG. 10 is a diagram showing an example of an operation picture plane of the print utility in the client 9 in FIG. 1.

By pressing a "Bookmark" button 602 at the upper right position on the operation picture plane of FIG. 5, a bookmark picture plane shown in FIG. 10 is newly displayed. The bookmark is a list of the URLs of the homepages and their titles. In the case where the bookmark which has already been registered exists, the contents of the list are displayed on this picture plane. When the operator designates a URL from the list, by selecting a desired URL and pressing the "OK" button 604 in a state where an inversion display is performed, the selected title and URL are reflected in 501 and 502 on the operation picture plane of FIG. 5. In case of newly adding a title and a URL, after the user inputted the title and URL to 501 and 502 on the operation picture plane of FIG. 5 by the input unit 302, by pressing an "Add Bookmark" button, they are added into the list.

The user opens each of the operation picture planes of FIGS. 5 to 9 by the above method and can set necessary items. After completion of the setting of all of the items, by pressing a "Print" button on the operation picture plane of FIG. 5, the print utility transmits the set contents to the digital copier 1.

Further, by pressing a "Monitor" button 603 on the operation picture plane of FIG. 5, an operation picture plane of FIG. 11 is displayed. In this instance, the print utility communicates with the digital copier 1, obtains the information regarding the jobs spooled in the digital copier 1, and displays on the operation picture plane. By referring to the display contents, the user can grasp a processing flow of the spooled jobs. The user can also cancel the spooled jobs. In this case, the user selects a job to be cancelled from the job information displayed on the operation picture plane, inversely displays the selected job, and presses a "Cancel" button. By pressing the "Cancel" button, the print utility transmits a cancel request including the job number of the designated job to the digital copier 1. The digital copier 1 which received the cancel request cancels the job whose job number coincides with the designated job number from the spooled jobs.

Figure 14:
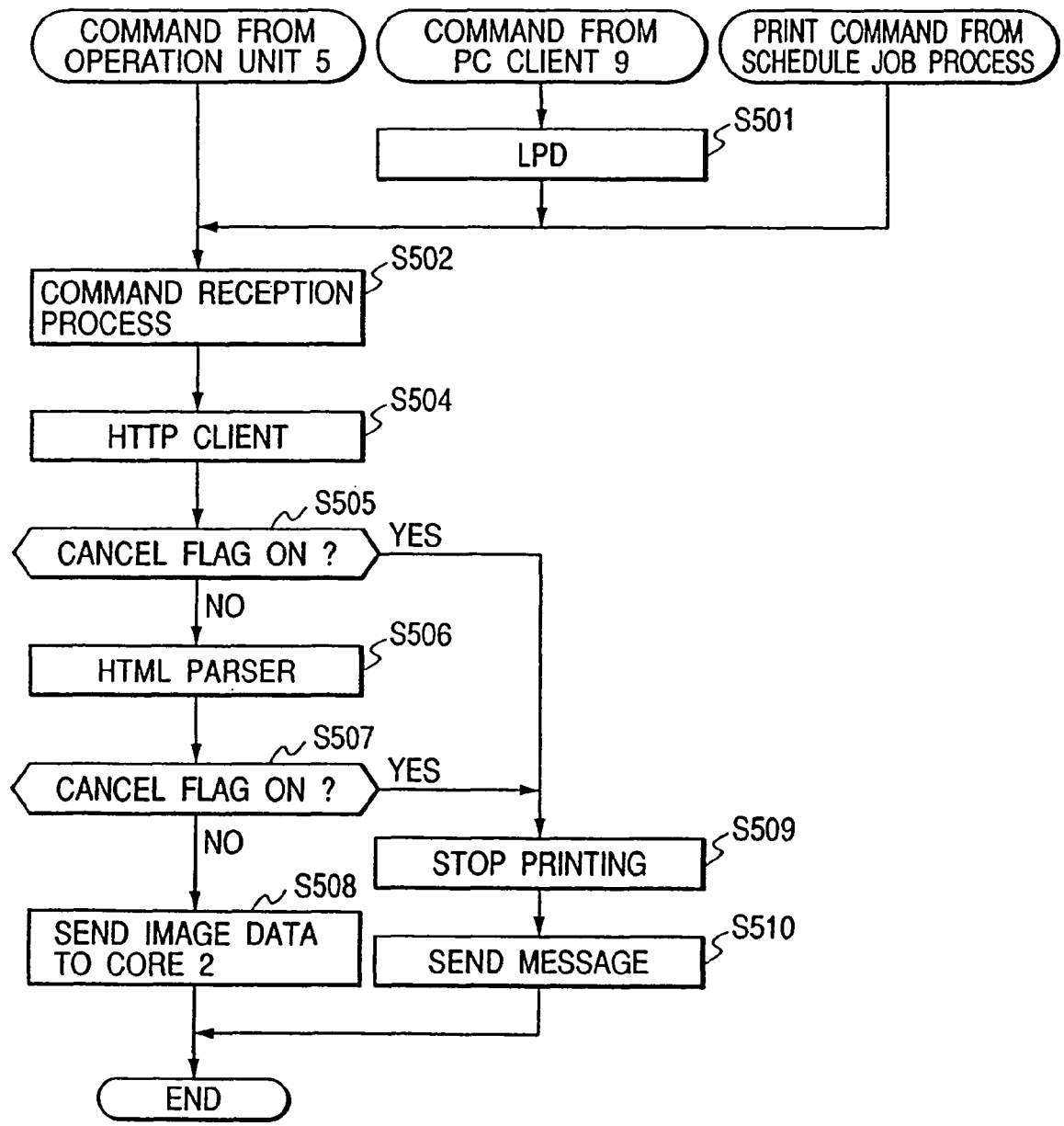
FIG. 14 is a flowchart showing a processing procedure for printing a homepage of the WWW server in the image forming apparatus of FIG. 1.
Figure 15:
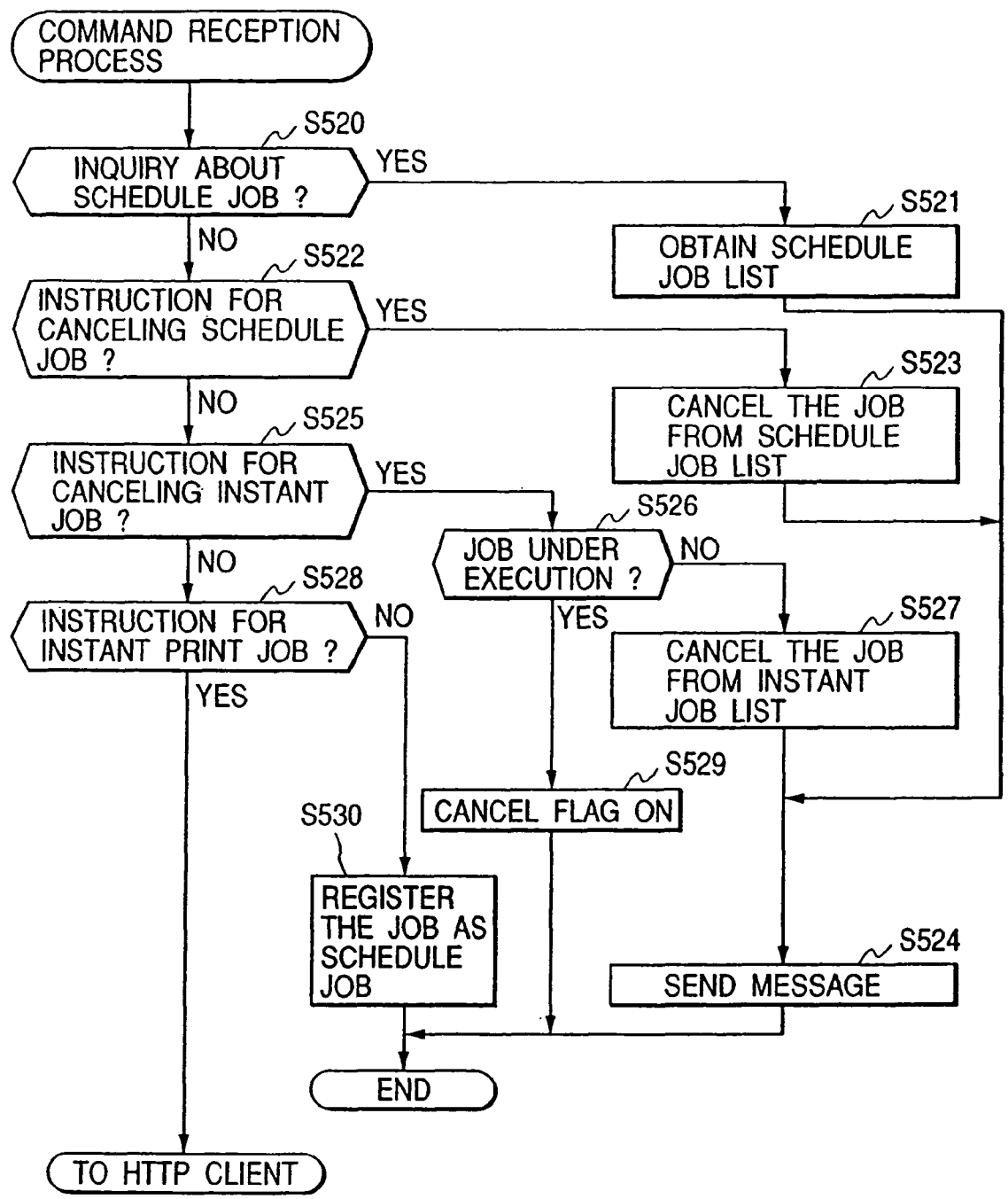
FIG. 15 is a flowchart showing a procedure for a command reception process in step S502 in FIG. 14.
Figure 16:
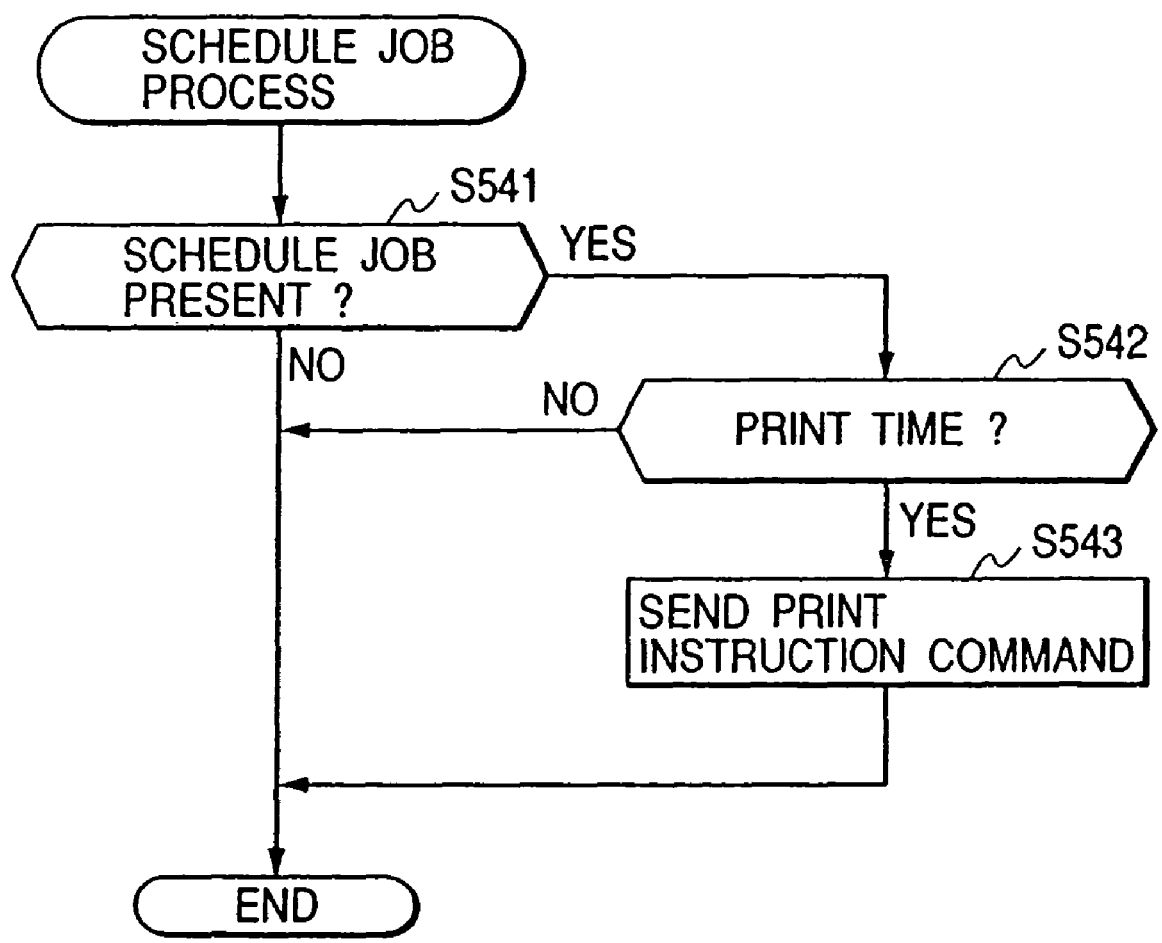
FIG. 16 is a flowchart showing a procedure for a schedule job process in the image forming apparatus of FIG. 1.

Subsequently, a procedure for printing the homepage of the WWW server will now be described with reference to FIGS. 12 to 16. FIG. 12 is a diagram showing an example of a construction of a control file which is transmitted from the print utility of the client 9 in FIG. 1 to the digital copier 1. FIGS. 13A to 13C are diagrams showing formats after completion of the conversion of an LPR command (FIG. 13A)/an LPQ command (FIG. 13B)/an LPRM command (FIG. 13C) in response to the Web Pull Print request/job information request/job cancel request from the print utility of the client 9 in FIG. 1. FIG. 14 is a flowchart showing a processing procedure for printing the homepage of the WWW server in the image forming apparatus of FIG. 1. FIG. 15 is a flowchart showing a procedure for a command reception process in step S502 in FIG. 14. FIG. 16 is a flowchart showing a procedure for a schedule job process in the image forming apparatus of FIG. 1.

When a command is issued from the print utility of the client 9 to the digital copier 1, a communication is executed between the print utility on the client 9 and the digital copier 1 by using an LPR protocol as an upper protocol of TCP/IP. In the network I/F 4 of the digital copier 1, an LPD (Line Printer Deamon) operates. When the command of the Web Pull Print request/job information request/job cancel request from the print utility is issued, as shown in FIG. 14, the LPD (Line Printer Deamon) which operates in the network I/F 4 of the digital copier 1 receives them as an LPR command/an LPQ command/an LPRM command (step S501). In this instance, each of the parameters set by the print utility is stored as character train data into a data file in an LPR command packet and is sent to the LPD. An example of the data file in the LPR command packet is shown in Table 2.

TABLE 2

START_OF_NETRETRIEVER_PARAMETERS
[JobControl]

| | |
|---|---|
| Homepage=http://www.canon.co.jp/index.htm | (2) |
| LinkLevel=0 | (6) |
| MaxPrintNum=0 | (7) |
| EndAfterComp=yes | (8) |
| GoOtherSite=yes | (9) |
| [AdditionalInfo] | |
| PrintLinkMap=yes | (10) |
| PrintTitle=yes | (14) |
| PrintPageNum=yes | (11) |
| PrintDate=yes | (12) |
| PrintURL=yes | (13) |
| HeaderText="" | (15) |
| HeaderPos=right | (16) |
| [Style] | |
| NextFirst=no | (19) |
| MiningScaleAtPaging=100 | (21) |
| HeaderNumOn=no | (18) |
| LeftMargin=25 | (29) |
| RightMargin=15 | (29) |
| TopMargin=15 | (29) |
| BottomMargin=15 | (29) |
| Ratio=100 | (20) |
| Drawbackground=no | (17) |
| StyleSheet=yes | (25) |
| CSS=http://www.canon.co.jp/style.css | (26) |
| [CSSFont:] | |
| FontFace=none | (22) |
| FontSize=regular | (23) |
| FontWeight=medium | (24) |
| [PostScript] | |
| PageSize=letter | (27) |
| Orientation=portrait | (28) |
| NumberOfCopies=3 | (30) |
| Duplex=yes | (33) |
| Sorter=staple | (31) |
| Resolution=600 | (32) |
| [Schedule] | |
| Schedule=Weekly | (34) |
| ModifiedOnly=no | (38) |
| Date=0401 | (36) |
| Time=2210 | (37) |
| Sun=yes | (35) |
| Mon=no | (35) |
| Tue=yes | (35) |
| Wed=no | (35) |
| Thu=yes | (35) |
| Fri=no | (35) |
| Sat=no | (35) |
| END_OF_NETRETRIEVER_PARAMETERS | |

In the example, the character train data starts with "START_OF_NETRETRIEVER_PARAMETERS" and ends with "END_OF_NETRETRIEVER_PARAMETERS". Each parameter is described in a form of "parameter name=value". The numbers written on the right side in Table 2 are used to make correspond to the serial numbers in the description of the contents of the set items of the print utility described above and are not written in the actual data file. Among the parameters set by the print utility, only "Print document title" and "User name" are stored into the control file in the LPR command packet. An example of the control file is shown in FIG. 12. Since the data flowing as an LPR command packet on the network is only the set parameters which are necessary for printing, its data amount is extremely smaller than that in the case where the data obtained by converting the homepage data into the printable format flows on the network as in the conventional technique.

The LPD converts the LPR command/LPQ command/LPRM command from the print utility into the formats shown in FIGS. 13A to 13C and transmits them to the core 2, respectively. In the core 2, the command reception process for receiving the request command from the LPD is always operating. When the request command from the LPD is received, the LPD executes the command reception process (step S502). As shown in FIG. 13, an identifier showing the kind of command (LPR/LPQ/LPRM) is added to the head of the format. In the command reception process, the command kind is discriminated with reference to the identifier and the contents of the command are analyzed in accordance with each format.

The operation unit 5 also has a print parameter setting function equivalent to the print utility on the client 9. By pressing a start button after the print parameter was set on the operation unit 5, the request command can be sent to the command reception process of the core 2. Further, the request command can be also issued from a schedule job process, which will be explained hereinlater.

Since the print instruction command from the operation unit 5 and the print instruction command from the schedule job process have the same data format (refer to FIG. 9) as that of the print instruction command from the client 9, the command reception process (step S502) by the core 2 can unitedly handle the print request instruction commands from those three portions.

Besides the print instruction command, an inquiry command of the job, a cancel command of the schedule job, and a cancel command of the instant job list are also issued from the client 9 and operation unit 5.

In the command reception process, as shown in FIG. 15, first in step S520, the core 2 discriminates whether the received command is the inquiry command of the schedule job or not. When the received command is the inquiry command about the schedule job, step S521 follows. The core 2 obtains the schedule job list. In subsequent step S524, the obtained schedule job list is transmitted as a message to the receiving party which issued the inquiry command about the schedule job and the processes are finished. When the issuing source of the inquiry command about the schedule job is the print utility, the received data is displayed on the operation picture plane (shown in FIG. 11) of the print utility.

When the received command is not the inquiry command about the schedule job, step S522 follows. The core 2 discriminates whether the received command is the cancel command of the schedule job or not. When the received command is the cancel command of the schedule job, step S523 follows. The core 2 cancels the job designated by the cancel command of the schedule job from the schedule list. In step S524, the schedule list after completion of the cancellation is transmitted as a message to the receiving party which issued the command. The processing routine is finished.

When the received command is not the cancel command of the schedule job, step S525 follows. The core 2 discriminates whether the received command is the cancel command of the instant job or not. When the received command is the cancel command of the instant job, step S526 follows. The core 2 obtains the instant job list and discriminates whether the designated job is being executed by the HTTP client 403 or HTML Parser 402 or not. When the designated job is not being executed, step S527 follows. The core 2 cancels the designated job from the instant job list. In step S524, the core 2 transmits the job list after completion of the cancellation as a message to the receiving party which issued the command. The processing routine is finished. When the job in which the cancellation was instructed is being executed by the HTTP client 403 or HTML Parser 402, step S529 follows. The core 2 turns on a cancel flag and finishes the processes.

When the received command is not the instant job cancel command, step S528 follows. The core 2 discriminates whether the received command is an instant print job command or not. When the received command is not the instant print job command, it is determined that the received command is a print command of the schedule job. In step S530, this job is registered into the schedule job and the processing routine is finished.

When the received command is the instant job print command, the processing routine advances to the process of the HTTP client 403 in step S504 in FIG. 14. To prevent that a large amount of memory capacity of the memory is consumed, the HTTP client 403 and HTML Parser 402 do not process a plurality of jobs in a lump in parallel. When another process has already been being executed, the job designated by the instant job print command job is registered into the instant job list and is executed immediately after the process was finished.

In step S504 shown in FIG. 14, the operation to obtain the HTML data, image data, and the like serving as data of the homepage from the WWW server is executed by the HTTP client 403.

When the operation by the HTTP client 403 is finished, step S505 follows. The core 2 discriminates whether the cancel flag is ON or not. When the cancel flag is ON, step S509 follows and the core 2 executes a print stopping process. In subsequent step S510, a message showing that the printing was cancelled is transmitted to the job issuing source and the processing routine is finished. When the cancel flag is OFF, step S506 follows and the core 2 starts the process by the HTML Parser 402. In the process of the HTML Parser 402, the printer 8 forms the printable image data on the basis of the data obtained from the WWW server.

After completion of the process of the HTML Parser 402, step S507 follows and the core 2 again discriminates whether the cancel flag is ON or not. When the cancel flag is ON, as mentioned above, the core 2 executes the print stopping process in step S509. In subsequent step S510, a message showing the printing was cancelled is sent to the job issuing source and the processing routine is finished. When the cancel flag is OFF, step S508 follows and the core 2 transmits the image data formed by the HTML Parser 402 to the data processor 124 of the core 2. The processing routine is finished. The data processor 124 of the core 2 which received the image data transfers it to the printer 8 through the reader 7. In the printer 8, the paper of the corresponding size is fed from the cassette 204 or 205 and the image data is printed onto this paper.

The schedule job process will now be described with reference to FIG. 16. FIG. 16 shows the control of the CPU 122 based on the schedule job program stored in the ROM 306 of the core 2. A main body of the control of the CPU 122 during the process is referred to as a schedule job module (hereinafter, abbreviated to an SJM).

The schedule job process is periodically activated once a minute. The schedule job is a job in which the day and time of execution have been set.

In the schedule job process, as shown in FIG. 16, first in step S541, the SJM discriminates the presence or absence of the schedule job. When there is no schedule job, the processing routine is finished. When there is the schedule job, step S542 follows. The SJM discriminates whether the print time which was set for the schedule job has reached or not. When the print time set for the schedule job does not reach, the processing routine is finished. When the print time set for the schedule job reaches, step S543 follows and the SJM transmits a print instruction command. The processing routine is finished. When the print instruction command is sent, as mentioned above, the instant print job is received by a command reception process in step S502. By this command, the image forming apparatus accesses to the WWW server and prints the homepage at the time designated in step S511.

As mentioned above, in the embodiment, the data of the WWW server is obtained by accessing to the WWW server on the network on the basis of the Web Print request from the print utility which is operating on the client 9 and is printed. Therefore, the data of the WWW server on the network can be directly obtained without passing through the client 9. When the data obtained from the WWW server is printed, the load which is applied to the network can be reduced. By issuing the Web Print request from the print utility which is operating on the client 9 to the digital copier 1, the Web Pull Print can be executed. The operability regarding the printing of the data obtained from the WWW server can be improved.

Although the embodiment has been described by using the TCP/IP for the communication protocol of the network, a similar effect is also obtained by using another communication protocol such as IPX/SPX, Apple Talk, or the like. Although the LPR and LPD have been used as a communication protocol with the client PC 11, a similar effect is also obtained even if another communication protocol such as HTTP, FTP, or the like in place of them.

(Second Embodiment)

Figure 17:
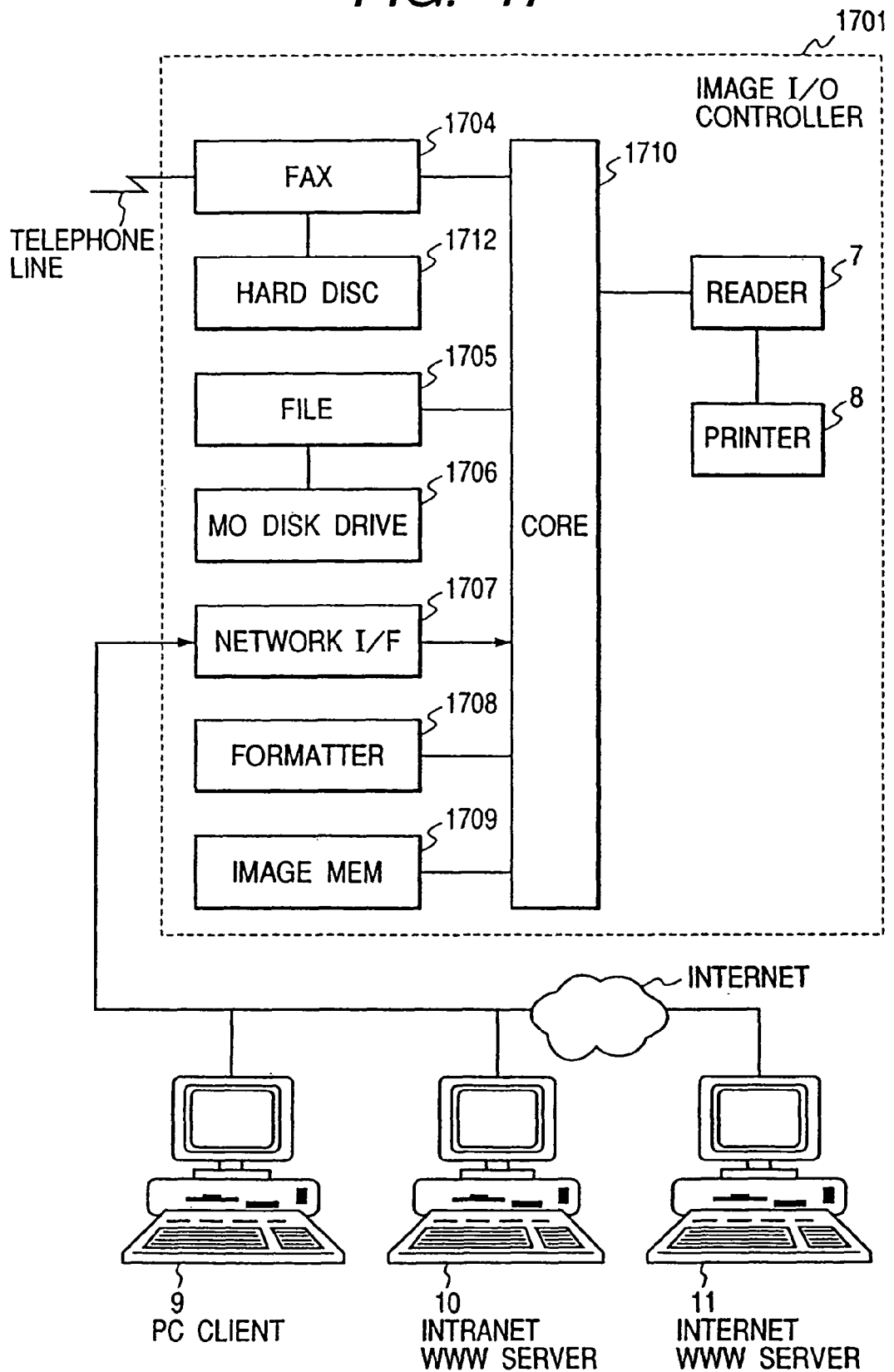
FIG. 17 is a block diagram showing a construction of the second embodiment of an image forming apparatus of the invention.

The second embodiment of the invention will now be described with reference to FIGS. 17 to 30. FIG. 17 is a block diagram showing a construction of the second embodiment of an image forming apparatus of the invention. The same component elements as those in the foregoing first embodiment are designated by the same reference numerals and their descriptions are omitted.

As shown in FIG. 17, the image forming apparatus of the embodiment comprises the reader 7, printer 8, and an image input/output controller 1701. The image I/O controller 1701 connects the reader 7 and has a facsimile 1704, a file 1705, a network I/F 1707, a formatter 1708, an image memory 1709, and a core 1710.

The facsimile 1704 is a circuit for decompressing compressed image data received through a telephone line, transferring the decompressed image data to the core 1710, compressing the image data transferred from the core 1710, and transmitting the compressed image data through the telephone line. A hard disc 1712 is connected to the facsimile 1704. The received compressed image data can be temporarily preserved in the hard disc 1712.

A magnetooptic (MO) disc drive 1706 is connected to the file 1705. The file 1705 compresses the image data transferred from the core 1710 and writes the compressed image data together with a key word for retrieving the image data onto a magnetooptic disc set in the MO disc drive 1706. The file 1705 retrieves the compressed image data stored on the MO disc on the basis of the key word sent through the core 1710, reads out and decompresses the retrieved compressed image data, and transfers the decompressed image data to the core 1710.

The network I/F 1707 has an interface to connect the image I/O controller 1701 to the network. The network comprises the intranet. The client 9 and a plurality of WWW servers 10 are connected to the intranet and are also connected to the internet network. A large number of internet WWW servers 11 exist in the internet network. Each of the WWW servers 10 and 11 opens a homepage. In the image forming apparatus according to the embodiment, in a manner similar to the foregoing first embodiment, the information of each homepage can be obtained from each of the WWW servers 10 and 11 through the network I/F 1707. Since a program construction in the network I/F 1707 is substantially the same as the foregoing first embodiment, its description is omitted.

The formatter 1708 develops code data showing the image which is transferred from the computer connected to the network I/F 1707 into image data which can be printed by the printer 8.

The image memory 1709 is a circuit to temporarily store the image data.

The core 1710 controls a flow of the data among the blocks of the reader 7, printer 8, facsimile 1704, file 1705, network I/F 1707, formatter 1708, and image memory 1709. By the control of the core 1710, processes in which the functions such as reading of the original image, printing of the image, transmission and reception of the image, preservation of the image, input and output of the data to/from the computer, and the like are combined can be executed.

The operation unit (not shown) is provided for the reader 7. Various keys for performing the setting regarding each of the function modes and a display to display information showing the setting state are provided for the operation unit.

Figure 18:
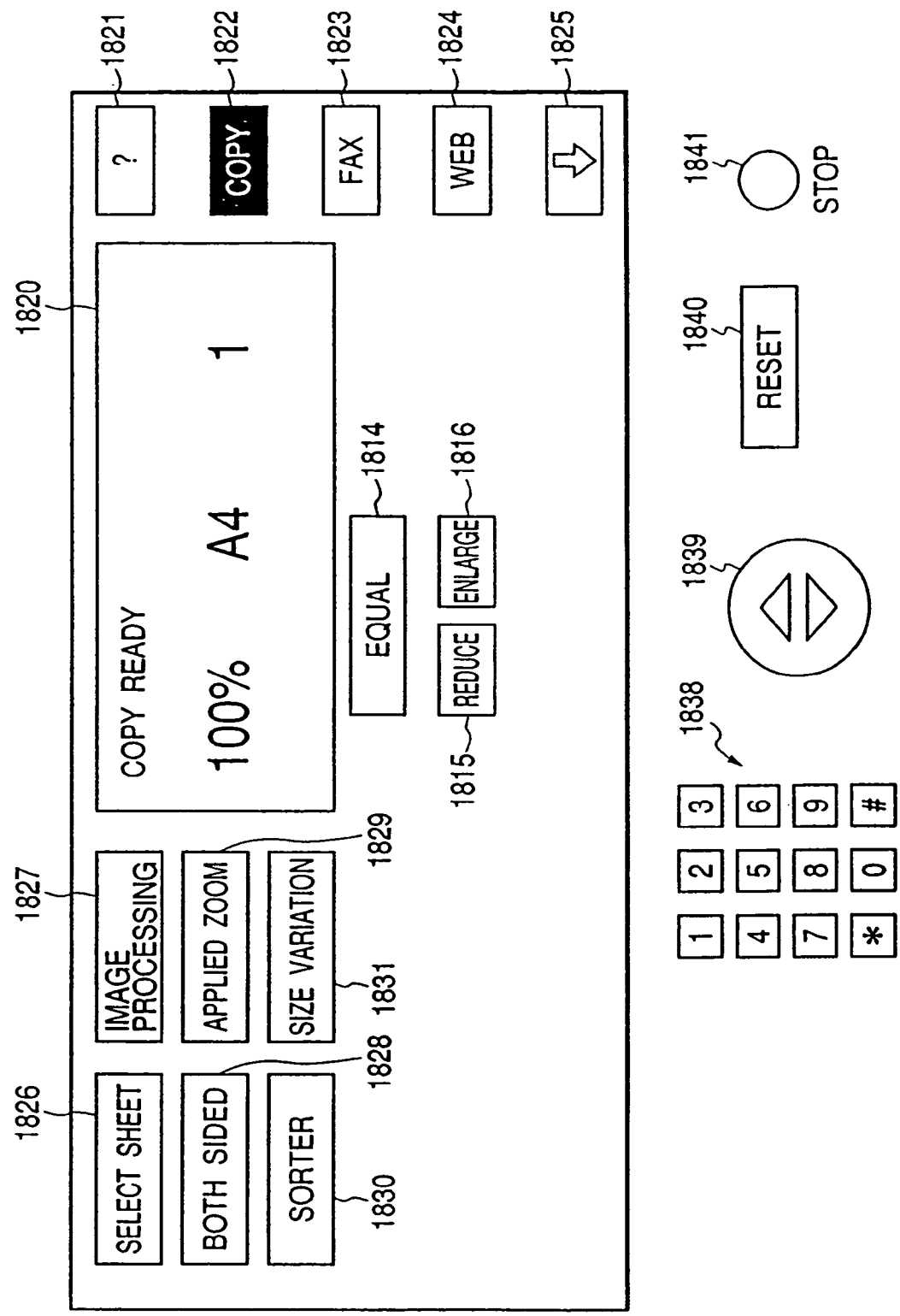
FIG. 18 is a diagram showing a construction and its picture plane example of an operation unit provided in a reader 7 in FIG. 1.
Figure 19A:
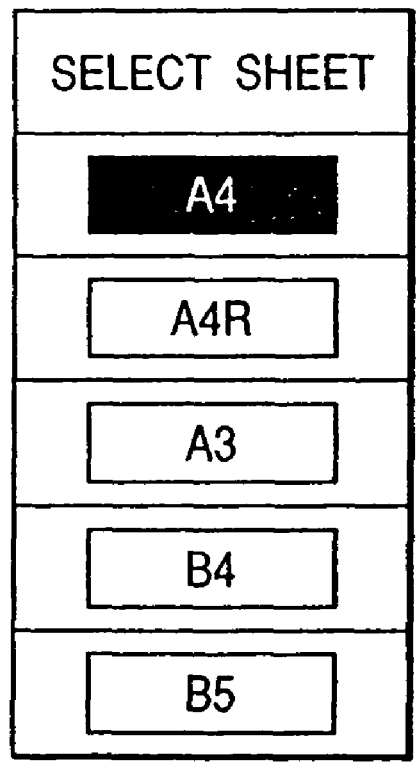
FIGS. 19A and 19B show a sheet selecting picture plane and a sorter process setting picture plane which are displayed in the operation unit.
Figure 19B:
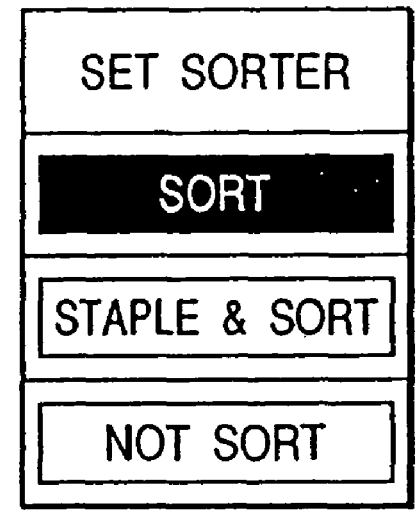

A construction of the operation unit will now be described with reference to FIG. 18. FIG. 18 is a diagram showing the construction of the operation unit provided for the reader 7 in FIG. 1 and an example of a picture plane of the operation unit. FIGS. 19A and 19B are picture planes for a sheet selection and a sorter processing setting which are displayed in the operation unit.

As shown in FIG. 18, the operation unit has a liquid crystal display provided with a touch panel and a plurality of hard keys 1838 to 1841. For example, when a copy mode is set, a window 1820 to display the present state and soft keys 1821 to 1831 to perform various settings are displayed in the liquid crystal display. In the diagram, the contents such that the apparatus is at present in the copy ready mode, a print size is equal to the size corresponding to the A4 paper, an enlargement magnification is equal to 100%, and one sheet is printed are displayed in the window 1820.

The soft key 1821 is a guide key for instructing a display of a proper advice when the user cannot understand the operation. The soft keys 1822 to 1824 are mode change keys. When the soft key 1822 is pressed, the copy mode is selected. An FAX mode is selected by the soft key 1823. A Web print mode (showing a Web Pull Print mode) is selected by the soft key 1824. The soft key 1825 is a key to display another mode key which is not displayed at present. When the key 1825 is pressed, a printer mode key or an FILE mode key is displayed.

The soft key 1826 is a select sheet key. By pressing this key, a select sheet input picture plane shown in FIG. 19A is displayed. A size of paper is selected by the inputting operation on the select sheet input picture plane. When the paper size is selected, the papers are fed from the cassette 204 or 205 in which the sheets of the selected size have been enclosed. The soft key 1827 is a key to display a processing menu picture plane for performing the setting regarding the image process. A trimming, a masking, a negative/positive inversion, a shadow process, or the like can be set by using a processing menu picture plane displayed by this key. The soft key 1828 is a key to display a menu picture plane for setting a process regarding the both-sided printing. One of three set modes for copying from a one-sided original to a one-sided original, from a one-sided original to a both-sided original, and from a both-sided original to a both-sided original can be selected by using the menu picture plane displayed by this key. The soft key 1829 is an applied zoom key for displaying a menu picture plane to set so that enlargement magnifications of portrait and landscape can be changed.

The soft key 1830 is a sorter key. By pressing this key, a menu picture plane regarding the sorter 220 shown in FIG. 19B is displayed. When the sort is selected on this menu picture plane, the printed matters of a plurality of sets are sorted every set and ejected to each bin of the sorter 220. When a staple sort is selected, the sorted printed matters are bound by using a stapler. When a group sort is selected, the originals of a plurality of sets are set so that the printed matters of the same page are ejected to the same bin.

The soft key 1831 is a size variation key and is a key to instruct whether originals of different sizes have been mixedly put on the platen glass or only the originals of the same size have been put thereon. When the size variation of different sizes is designated, the original size is checked every scanning. If the size variation is not designated, the original size of only the first page is checked. The soft key 1814 is an equal size key to return the enlargement magnification to the setting of 100%. The soft keys 1815 and 1816 are a reduction key and an enlargement key for displaying menus to set the reduction magnification and the enlargement magnification, respectively.

As hard keys, the ten-key 1838, start key 1839, reset key 1840, and STOP key 1841 are provided. In the example of the present picture plane, the ten-key 1838 is used to input a print quantity. When the reset key 1840 is pressed, parameters necessary to copy are returned to default values. The parameters which are necessary to copy are set before the copy is started. After the necessary parameters were set, by pressing the start key 1839, the copying operation is started. After the copy was started, by pressing the STOP key 1841 and reset key 1840, the copying operation is interrupted.

Examples of operation picture planes in the Web print mode which are displayed in the operation unit will now be described with reference to FIGS. 20 to 28 and 29. FIGS. 20 to 26 and 29 are diagrams showing examples of the operation picture planes in the Web print mode which are displayed in the operation unit.

Figure 20:
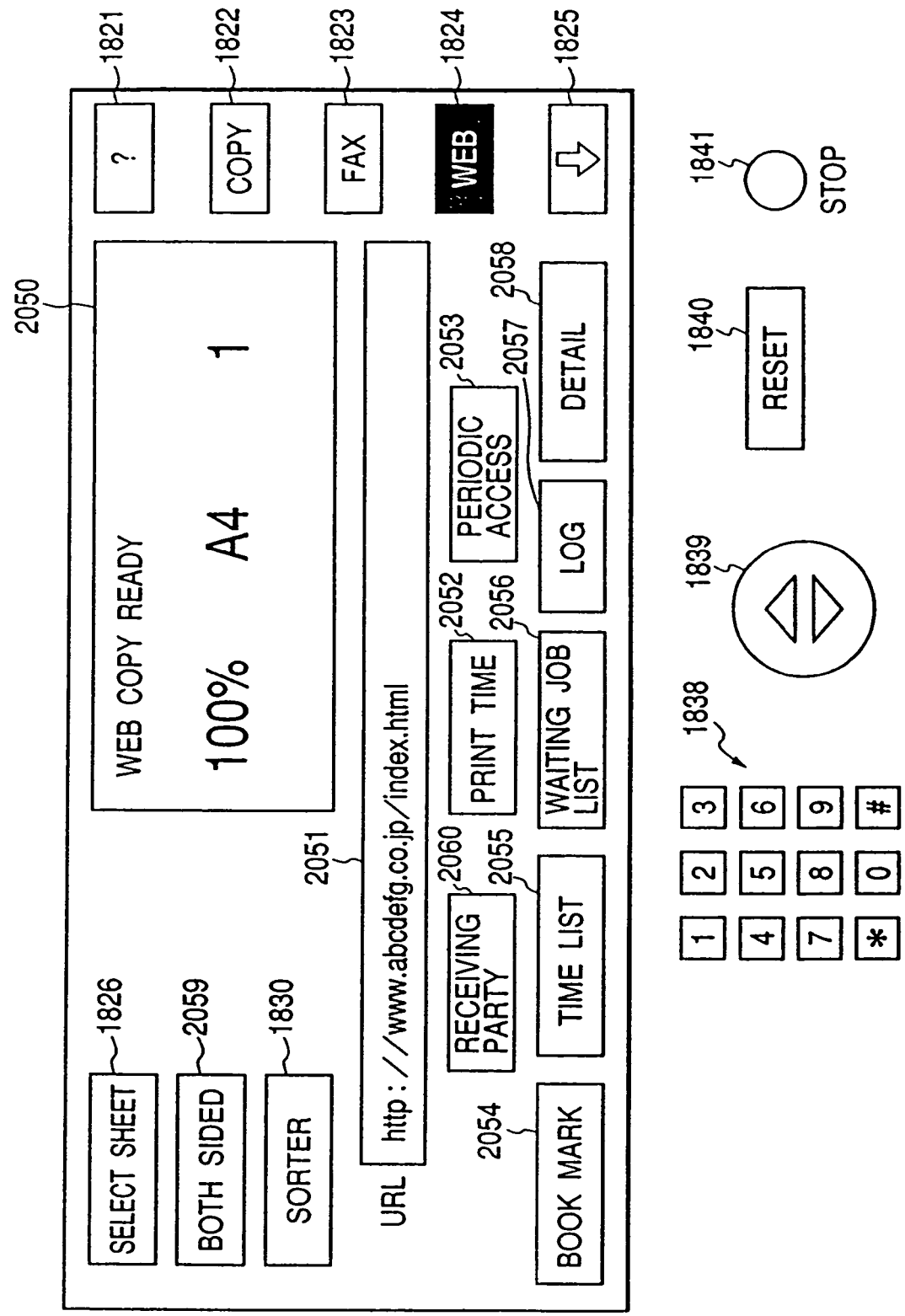
FIG. 20 is a diagram showing an example of an operation picture plane of a Web print mode which is displayed in the operation unit.

When the Web print mode is set, as shown in FIG. 20, the soft key 1824 (Web print mode key) is first pressed. The window 1820 to display the present state of the Web print mode is displayed in the liquid crystal display. In this example, the contents such that the printing is performed at the A4 sheet size, an enlargement magnification is equal to 100%, and one sheet is printed are displayed in the window 1820. The soft keys 1821 to 1826 and 1830 to perform the same setting instruction as that in the copy mode and soft keys 2052 to 2059 to perform the setting instruction different from that of the copy mode are displayed in the liquid crystal display.

The soft key 2059 is a key to display a menu picture plane to set processes regarding the both-sided printing. By using the menu picture plane displayed by this key, when the data from each of the WWW servers such as WWW server 10 on the intranet, WWW server 11 on the internet, and the like is printed, whether it is printed to one side or both sides can be set. The setting contents regarding the both-sided printing by the soft key 2059 are different from the setting contents by the soft key 1828 of the picture plane (shown in FIG. 18) in the copy mode. However, in the FAX mode or printer mode, the same contents as those of the soft key 2059 are set. In the present picture plane example, the ten-key 1838 is used to set a print quantity in a manner similar to that in the picture plane in the copy mode.

A soft key 2051 is a URL key. The URL key is also commonly used as a picture plane to input a domain name of each WWW server and a file name of data of the HTML format to be obtained. By pressing the soft key 2051, a virtual alphabet keyboard (not shown) is displayed. A character train to designate the foregoing data is inputted by using the virtual alphabet keyboard.

Figure 21:
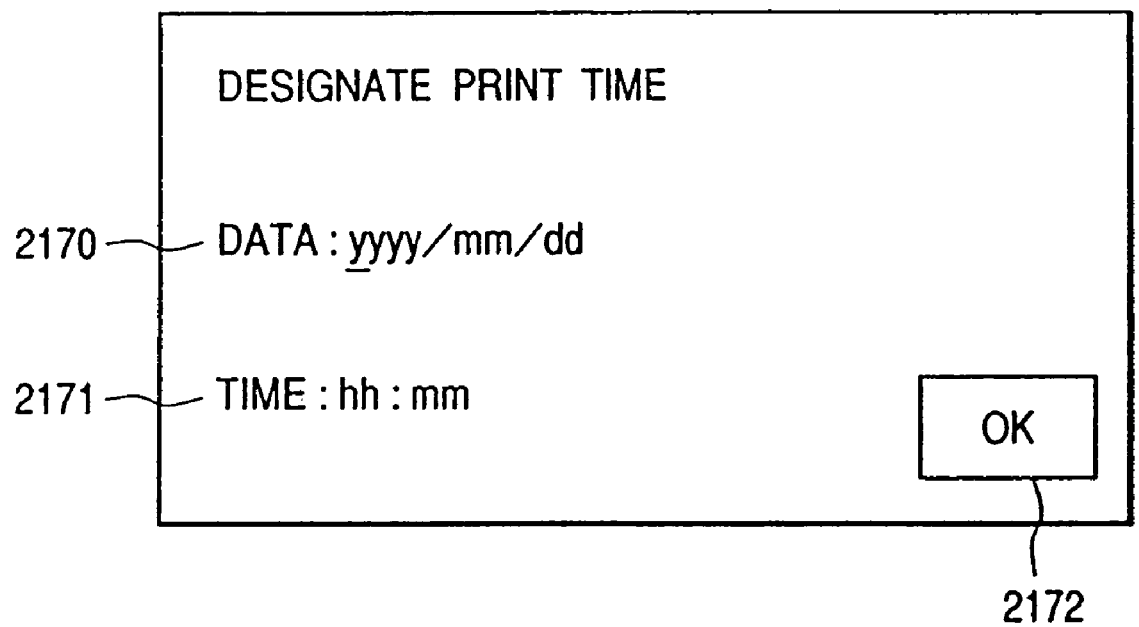
FIG. 21 is a diagram showing an example of an operation picture plane of the Web print mode which is displayed in the operation unit.

The soft key 2052 is a print time key. The print time key is a key to open a window for setting a date and time to obtain the data of the HTML format, image file, and the like by accessing to the WWW server. When the soft key 2052 is pressed, a window shown in FIG. 21 is opened. In this window, as shown in FIG. 21, a cursor first flickers so as to promote the user to input a print date 2170. By inputting a numerical value from the ten-key 1838, the print date is set. When the input of the print date 2170 is finished, the cursor is moved to an input column of a print time 2171 and flickers to promote the user to input. In a manner similar to the input to the print date 2170, a numerical value showing a print time is inputted from the ten-key 1838 and the print time is set. When the input of the print time 2171 is finished, an OK key 2172 is displayed. By pressing the OK key 2172, the print time is set and the screen is again switched to the picture plane of FIG. 18. In a time zone when there are many network traffics, there is a case where the data of the WWW server cannot be correctly obtained. Therefore, by designating the print time as mentioned above, such a time zone can be avoided.

Figure 22:
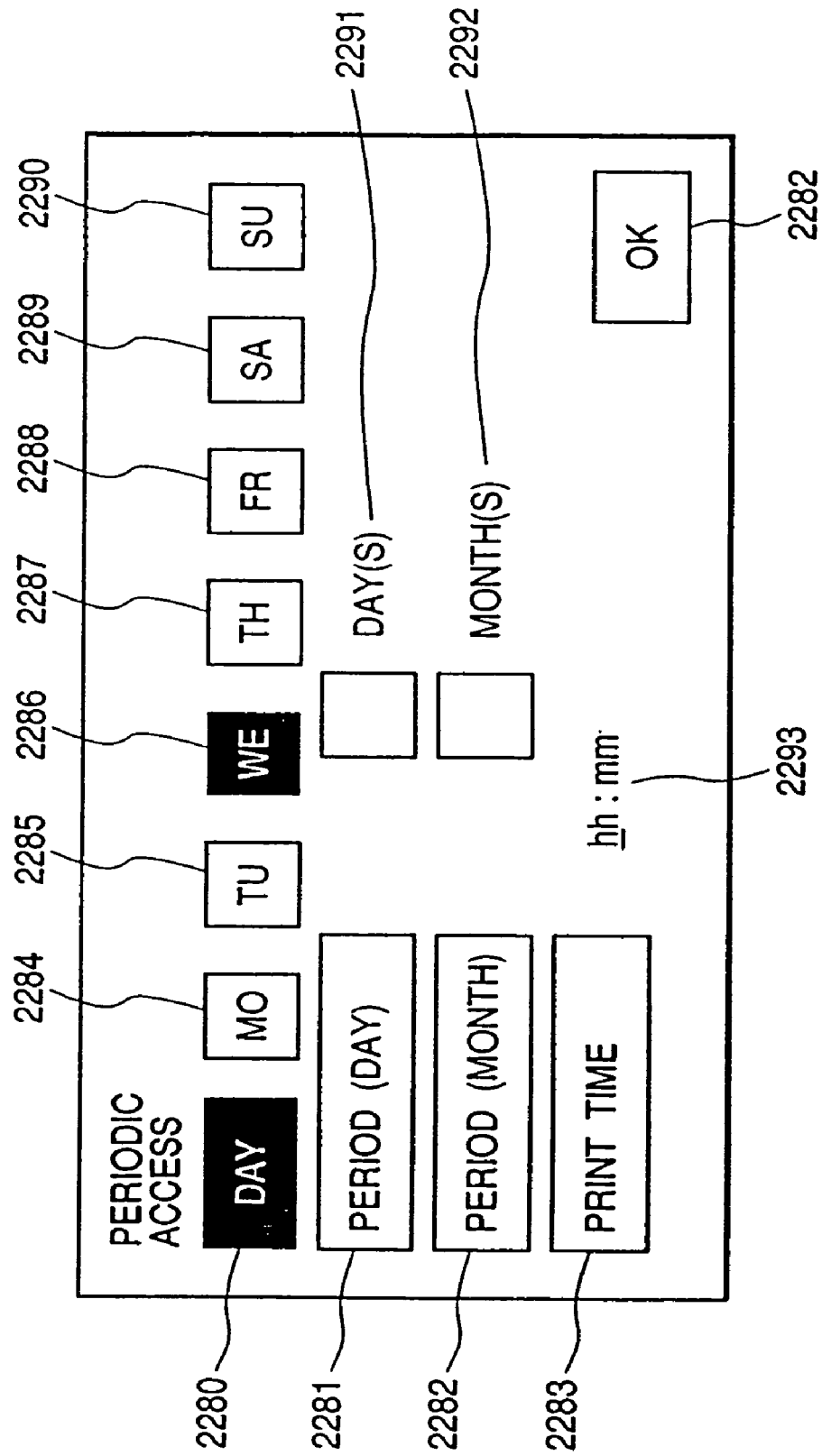
FIG. 22 is a diagram showing an example of an operation picture plane of the Web print mode which is displayed in the operation unit.

The soft key 2053 is a periodic access key for periodically accessing to the WWW server and executing the printing. By pressing the periodic access key, a window shown in FIG. 22 is displayed. In this window, as shown in FIG. 22, soft keys including a day of the week key 2280, a period (day) key 2281, a period (month) key 2282, and a print time key 2283 are displayed. Whether the period to periodically access to the WWW servers is inputted on a unit basis of a day of the week, day, or month can be selected by each of the soft keys of the day of the week key 2280, period (day) key 2281, and period (month) key 2282. The number of soft keys which are activated among those three soft keys 2280, 2281, and 2282 is only one. When one of them is selected, the set items in the other keys are cancelled. For example, when the day of the week key 2280 is selected, seven keys comprising a Monday key 2284 to Sunday key 2290 are validated. A plurality of those keys can be selected. When they are selected, the selected keys are displayed in black. When those keys are again pressed in the selected state, the selection is cancelled and they are displayed in white. When the period (day) key 2281 is selected, the cursor moves to an input column 2291 of the day and flickers. By inputting a numerical value into the input column 2291 from the ten-key 1838, a period of day to access to the WWW server is set. When the period (month) key 2282 is selected, the cursor moves to an input column 2292 of the month and flickers. By inputting a numerical value into the input column 2292 from the ten-key 1838, a period of month to access to the WWW server is set.

When the print time key 2283 is pressed, the cursor moves to an input column 2293 of the time and flickers. By inputting a numerical value into the input column 2293 from the ten-key 1838, a period of time to access to the WWW server is set.

When each data is set as mentioned above and the OK key 2172 is pressed, the parameter of the periodic access is decided. The switching to the picture plane of FIG. 18 is again performed.

Figure 23:
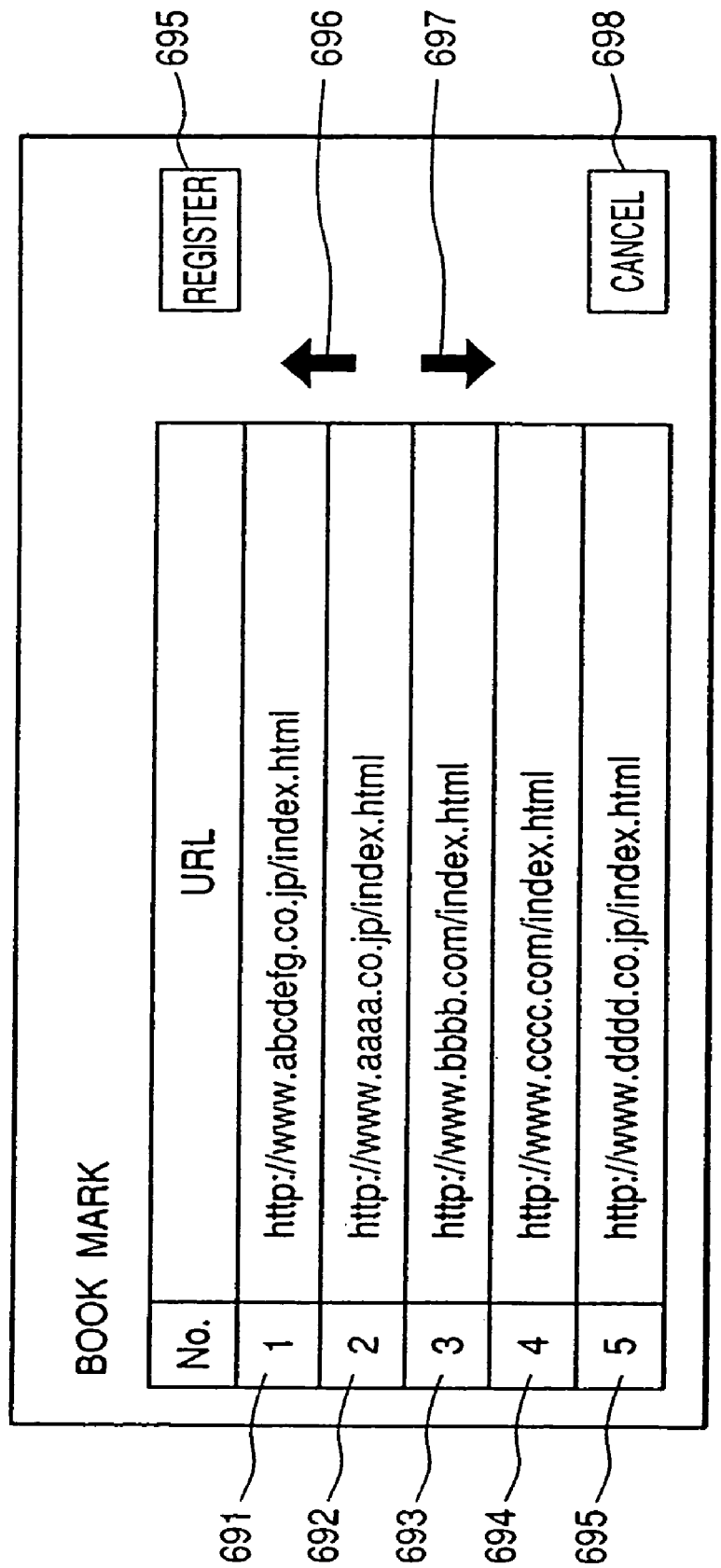
FIG. 23 is a diagram showing an example of an operation picture plane of the Web print mode which is displayed in the operation unit.

The soft key 2054 is a Book Mark key to display a BOOK MARK window shown in FIG. 23. By pressing this key, the BOOK MARK window is opened. In this window, as shown in FIG. 23, a list (five registered URLs 690 to 694 can be displayed in one screen) in which the URLs which have already been registered are written is displayed. When an up arrow key 696 is pressed in this instance, the URL list is scrolled upward. When a down arrow key 697 is pressed, the URL list is scrolled downward. When a register key 695 is pressed, the URL of the WWW server inputted by the soft key 2051 (URL key) shown in FIG. 20 is additionally registered into this list. By pressing any one of the writing portions 690 to 694 of the URLs on the URL list, the URL of the pressed writing portion is selected and data is set into the soft key 2051 (URL key). By pressing a cancel key 698, the URL selected by pressing one of the writing portions 690 to 694 of the URLs on the URL list is cancelled from the URL list.

Figure 24:
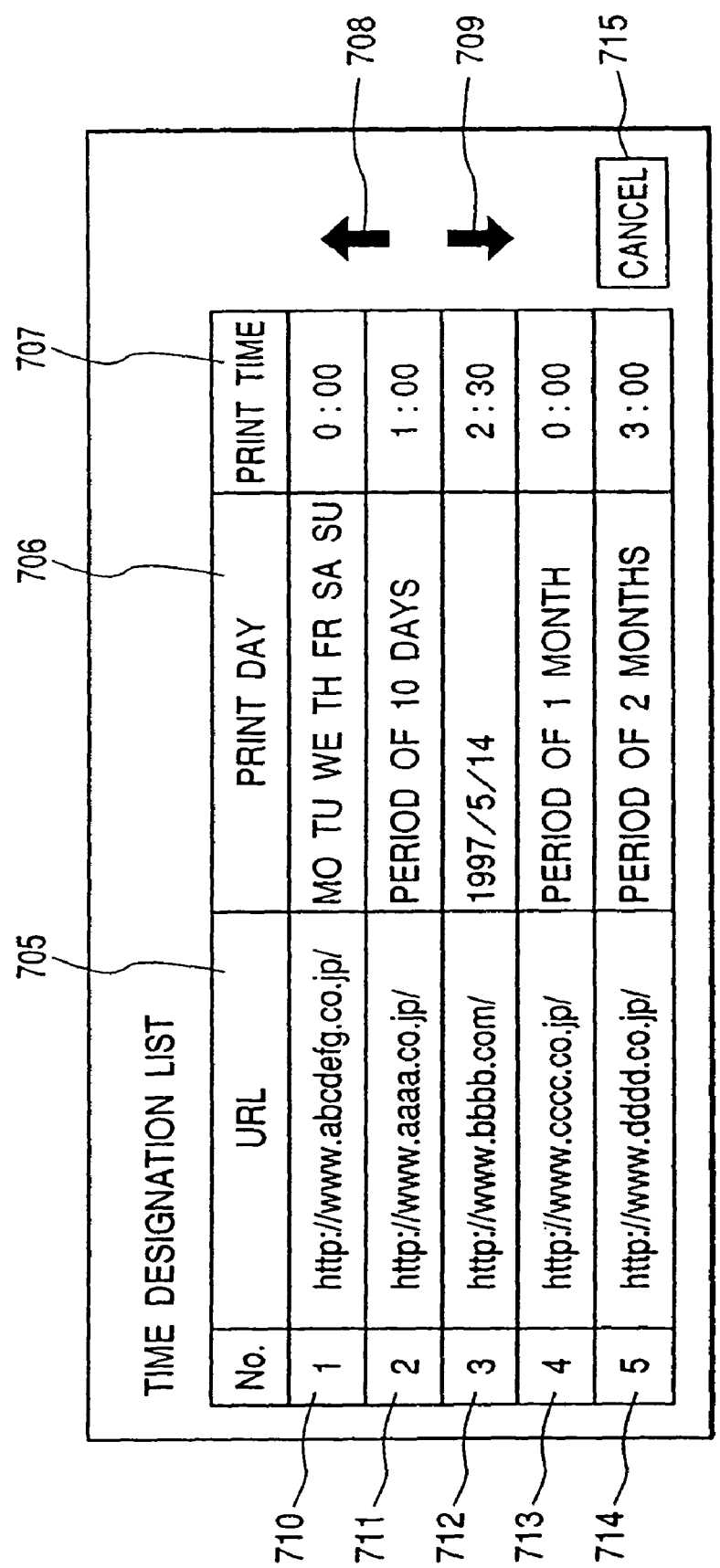
FIG. 24 is a diagram showing an example of an operation picture plane of the Web print mode which is displayed in the operation unit.

The soft key 2055 is a time designation list key to display a time designation list shown in FIG. 24. In this time designation list, as shown in FIG. 24, the job designated by the soft key 2052 (print time designation key) or soft key 2053 (periodic access designation key) is registered. Display items of the time designation list are a URL 705, a print day 706, and a print time 707. In the time designation list, the five registered URLs 710 to 714 can be displayed in one screen. The list can be scrolled upward by an up arrow key 708. The list can be scrolled downward by a down arrow key 709. When any one of the area portions 710 to 714 on the list is pressed, the URL written in the pressed area portion is selected. By pressing a cancel key 715 in a state where the URL was selected, the selected URL is cancelled from the time designation list. In the example of the time designation list, the job 710 is a job in which the day of the week has been registered by the soft key 2053 (periodic access designation key). The day of the week for execution is displayed in the job in correspondence thereto. In the job 711 designated at a period on a day unit basis, the designated number of days is displayed in correspondence thereto. In the jobs 713 and 714 designated on a month unit basis, the designated number of months is displayed in correspondence thereto. The job 712 is a job registered by the soft key 2052 (print time designation key). In this job, the designated print time is displayed in correspondence thereto.

Figure 25:
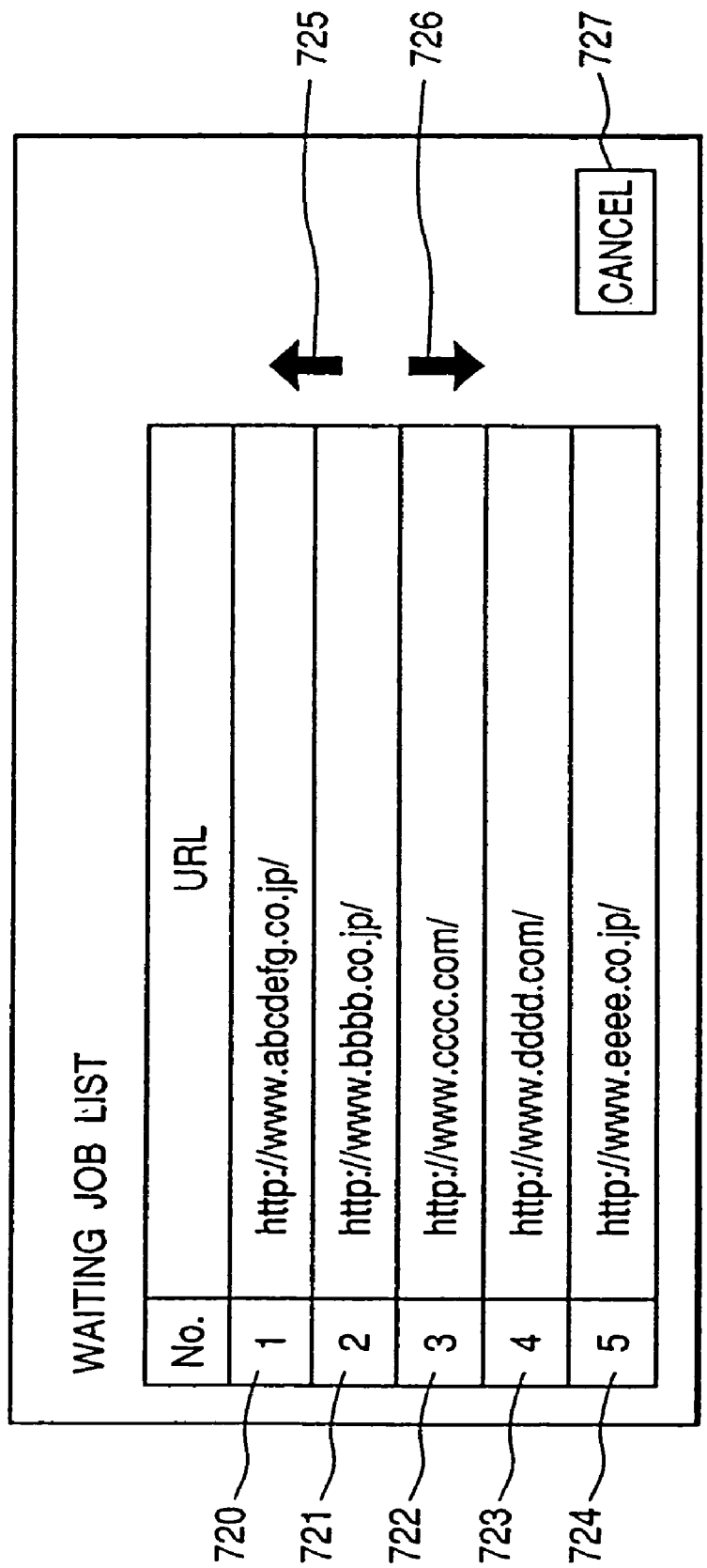
FIG. 25 is a diagram showing an example of an operation picture plane of the Web print mode which is displayed in the operation unit.

The soft key 2056 is a waiting JOB list key to display a waiting JOB list window shown in FIG. 25. When this key is pressed, as shown in FIG. 25, the waiting JOB list in which URLs 720 to 724 of the jobs in the waiting state have been written is displayed. When a number of execution waiting jobs exist, the list is scrolled upward by pressing an up arrow key 725. The list is scrolled downward by pressing a down arrow key 726. By pressing any one of the area portions 720 to 724 on the list, the job written in the pressed area portion is selected. By pressing a cancel key 727 in a state where the job was selected, the selected job is cancelled from the waiting JOB list.

The soft key 2057 is a log key to display a log list shown in FIG. 26. In this log list, as shown in FIG. 26, results obtained by accessing to the WWW servers in the Web print mode are written. The access results are sequentially listed up in accordance with the order of the new job from the head. The old access results exceeding the maximum number of results are automatically cancelled. Specifically speaking, display items of the log list comprise a URL 737, a date 738, a time 739, and a result 740. The URL 737 shows the URL of the accessed WWW server. The date 738 and time 739 show the day and time when the WWW server is accessed. In the case where the WWW server is normally accessed and the data obtained from this WWW server can be printed and outputted, "SUCCESS" is displayed as shown in a result 740 of each of the URLs 730, 733, and 734. On the other hand, when the user interrupts the printing by a reset key 1840, "RESETED" is displayed as shown in the URL 731. When the printing cannot be normally performed due to a state of the network, a state of the WWW server, or the like, "ERROR" is displayed like a URL 732. The list can be scrolled upward by an up arrow key 735 and can be scrolled downward by a down arrow key 736.

The soft key 2058 is a details set key for displaying a menu picture plane to set parameters written in Table 3, which will be explained hereinlater.

Figure 29:
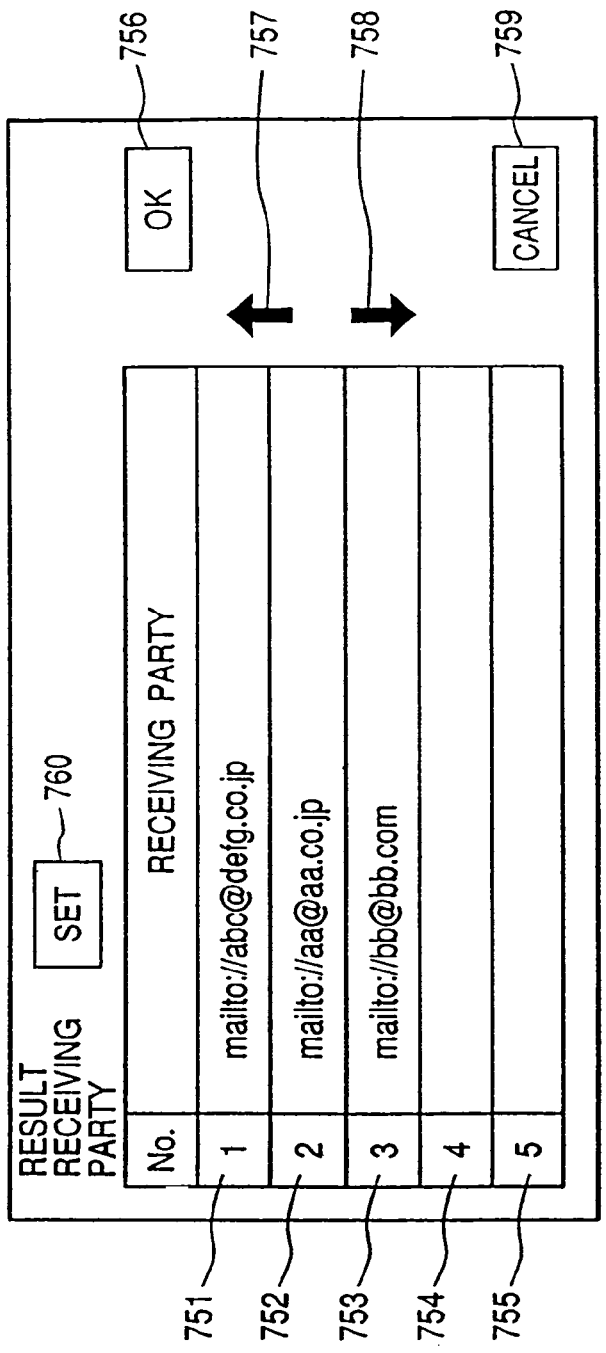
FIG. 29 is a diagram showing an example of an operation picture plane in the Web print mode which is displayed in the operation unit.

The soft key 2060 is a result receiving party soft key to display a window of a result receiving party list shown in FIG. 29. By pressing this key, as shown in FIG. 29, a waiting JOB list describing addresses 751 to 755 (three addresses of 751 to 753 have been registered here) of the destinations as result receiving parties is displayed. When a number of destinations as result receiving parties exist, the list is scrolled upward by pressing an up arrow key 757 and is scrolled downward by pressing a down arrow key 758. By pressing a set key 760, a mail address of the inputted destination is additionally registered into this list. By pressing any one of the area portions 751 to 755 on the list, the destination written in the pressed area portion is selected. By pressing a cancel key 759 in a state where the destination was selected, the selected destination is cancelled from the result receiving party list.

TABLE 3

| No. | Set items | Set contents | Default value |
|---|---|---|---|
| 1 | The max. number of links of HTML to be printed | | 0 |
| 2 | The max. number of pages to be printed | | 0 (infinite) |
| 3 | The present HTML is printed even if the page number exceeds the max. number of pages | YES/NO | YES |
| 4 | The HTML of another site is also printed | YES/NO | NO |
| 5 | Time-out time | | 2 min. |
| 6 | The number of retry times at the time of error | | 8 times |
| 7 | Font name which is used | | None |
| 8 | Designation of Font size | | None |
| 9 | Thickness of Font | thick/normal/thin | Normal |
| 10 | Left margin of print | | 10 mm |
| 11 | Right margin of print | | 10 mm |
| 12 | Top margin of print | | 10 mm |
| 13 | Bottom margin of print | | 10 mm |
| 14 | The background is also printed | YES/NO | NO |
| 15 | A header and a footer (URL, Page, Number, Print date) are added and print | YES/NO | YES |

TABLE 3-continued

| No. | Set items | Set contents | Default value |
|---|---|---|---|
| 16 | A link map is printed or not | | NO |
| 17 | Style sheet | Not used/sheet name | Not used |

The data of the HTML format which is received from the WWW server can be hyper-linked to another HTML data. There is also a case where the hyper-linked HTML data has been hyper-linked to further another HTML. To set the link level, the parameter 1 is set. The parameter 1 is a parameter for tracing back the link of the designated URL and setting the maximum link level. By this parameter, the maximum number of links of the HTML to be printed is set.

The parameter 2 is a parameter to set the maximum number of pages to be printed. The HTML data from the WWW server is arranged in accordance with the paper size set by the soft key 1826 (select sheet key), so that if the number of necessary pages exceeds the maximum number of pages set by the parameter 2, the parameter is set so as not to print out the pages over the maximum number of pages. In this example, "0" is set as a default value. In the default value "0", the maximum number of pages to be printed is set to be limitless.

The parameter 3 is a parameter to set whether the present HTML data is printed or not even if the number of necessary pages exceeded the maximum number of pages. This parameter is a function which can be selected by the user because when the number of necessary pages exceeds the maximum number of pages set by the parameter 2, there is a situation such that it will be troublesome unless the print data is printed to the end for a document of one HTML.

The parameter 4 is a parameter to set whether the HTML of another site is also printed or not. When the link level of the parameter 1 is set to 1 or more, a case where the document of the HTML in which the printing was executed is hyper-linked to the HTML of the other site exists. In this case, since there is a possibility such that the HTML document of the other site is a homepage which is not interested for the user at all, by setting the parameter 4, the user can select whether the HTML of the other site is also printed or not.

The parameter 5 is a parameter to set a time-out time. By setting the time-out time by this parameter, if a communication error regarding the network such as TCP/UDP 404 (shown in FIG. 4) or the like occurs, it is prevented that the retry is repeated for a long time.

The parameter 6 is a parameter to set the number of retry times at the time of an error in the case where a communication error occurs in the HTTP client program 403.

The parameter 7 is a parameter for setting a font name which is used. The parameter 8 is a parameter to designate a font size. The parameter 9 is a parameter to set a thickness of font. The parameters 7, 8, and 9 are used for setting with respect to the font to print the HTML text data.

The parameter 10 is a parameter to set a Left margin of print. The parameter 11 is a parameter to set a Right margin of print. The parameter 12 is a parameter to set a Top margin of print. The parameter 13 is a parameter to set a Bottom margin of print. The parameters 10, 11, 12, and 13 are used to specify the right, left, top, and bottom margins in the sheet size set by the soft key 1826 (select sheet key).

The parameter 14 is a parameter to set whether the background is also printed or not. By the setting of this parameter, it is possible to prevent a situation such that although there is no problem in the case where a homepage whose background is drawn in black or the like is displayed on a color display, if this homepage is printed by a black and white printer, both of the text portion and the background become black, so that the text cannot be discriminated.

The parameter 15 is a parameter to set whether a header and a footer (URL, Page No., print date) are added and the resultant print data is printed or not. By the setting of this parameter, whether the URL, Page No., and print date which are not written in the homepage on the WWW server are added at the stage of the execution of the print layout or not can be selected.

The parameter 16 is a parameter to set whether a link map is printed or not. In the case where the maximum link level to be printed is set to 1 or more by the parameter 1, by using this parameter, the user can select whether the link information showing how the printed HTML document has been hyperlinked is printed or not.

The parameter 17 is a parameter to set whether the style sheet is used or not. The style sheet is a data sheet describing a parameter to eliminate a problem such that since a name of font to print, a font size, and the like are not specified in the HTML data, layout results differ every program to lay-out the homepages. In case of using the style sheet, it is necessary to designate the name of the sheet to be used. By designating the sheet name, the sheet which is used is designated. A layout is performed in accordance with the information of the designated sheet.

Figure 27:
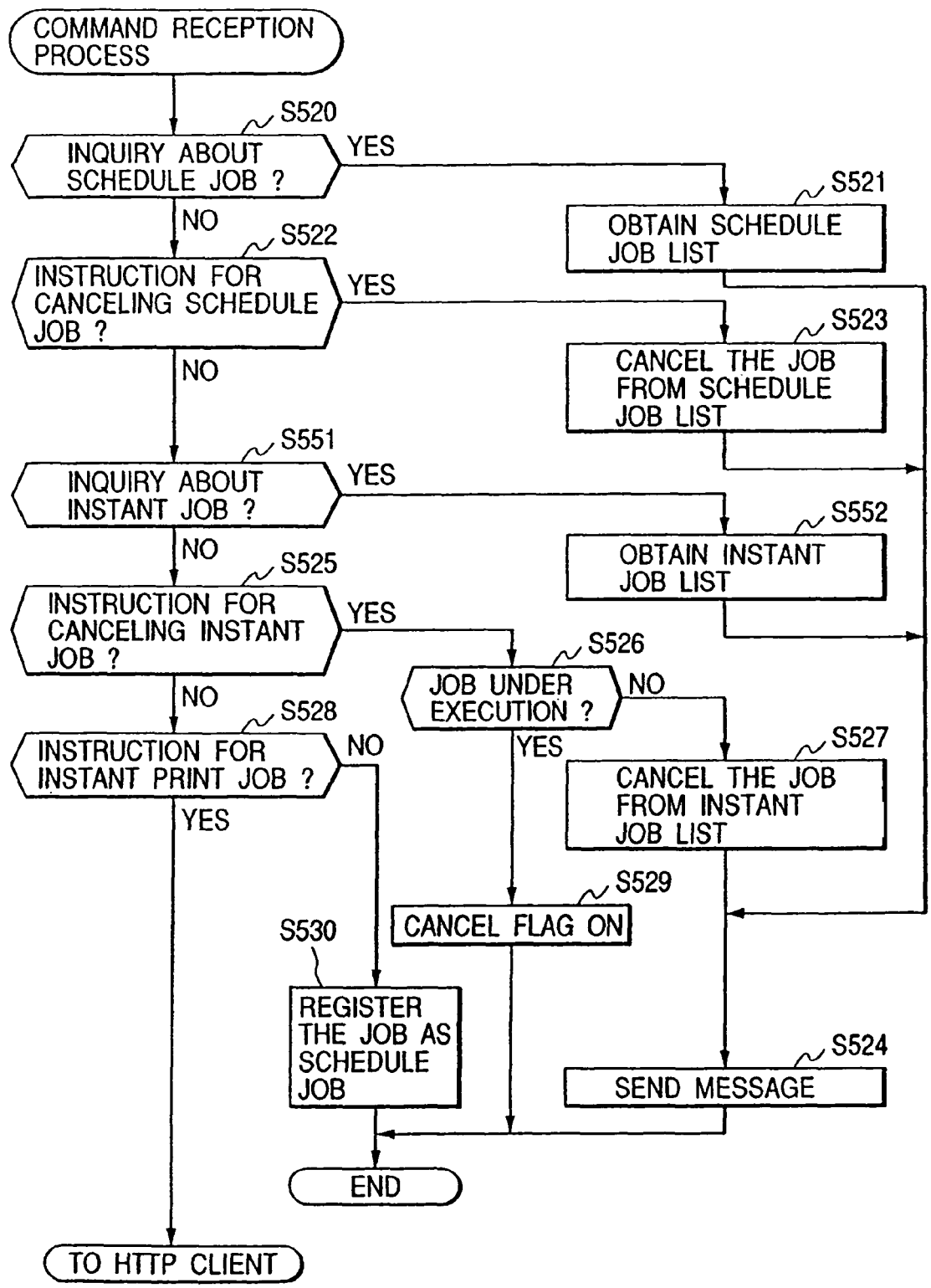
FIG. 27 is a flowchart showing a procedure for a command reception process in the image forming apparatus of FIG. 17.
Figure 28:
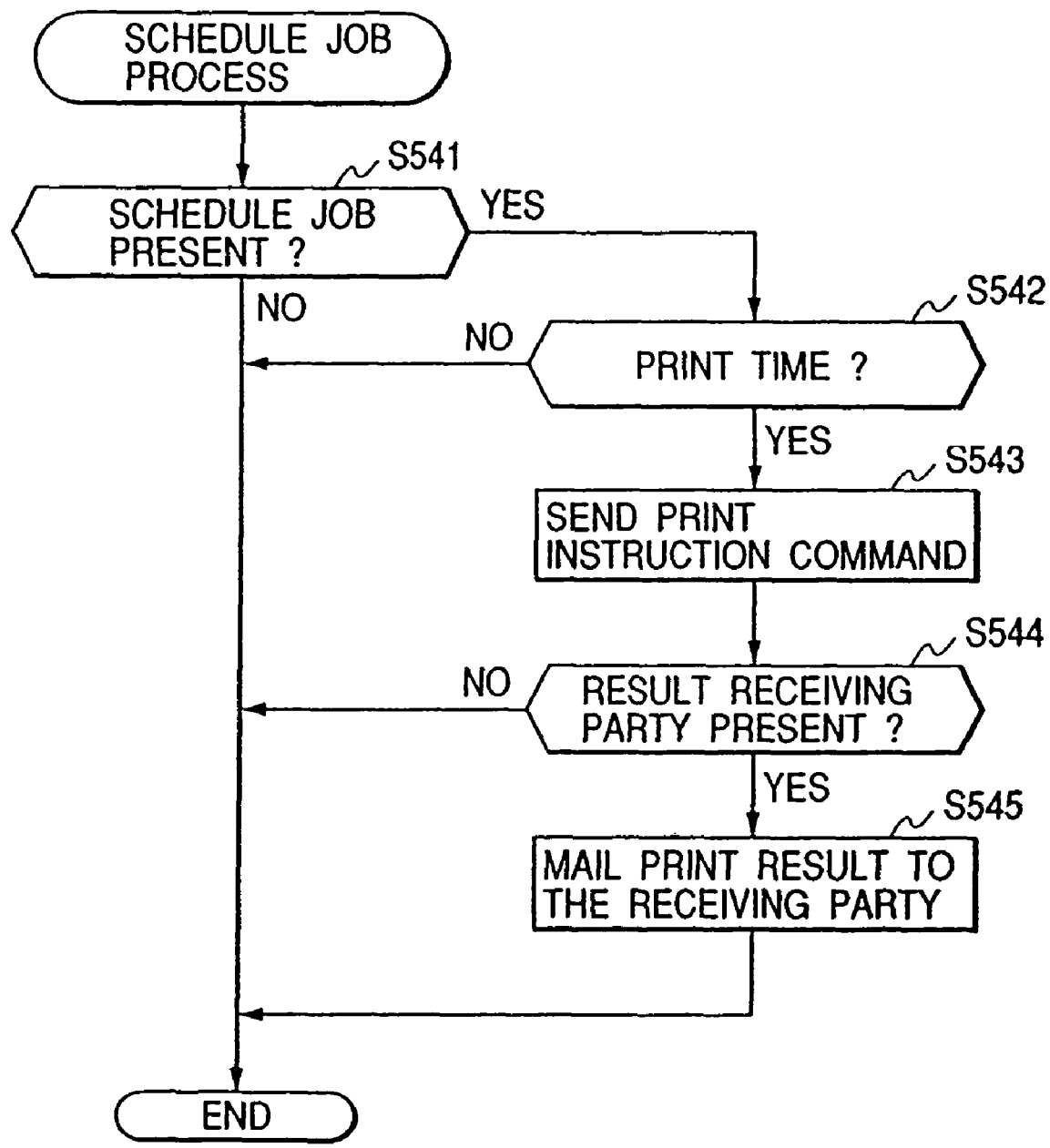
FIG. 28 is a flowchart showing a procedure for a schedule job process in the image forming apparatus of FIG. 17.
Figure 30:
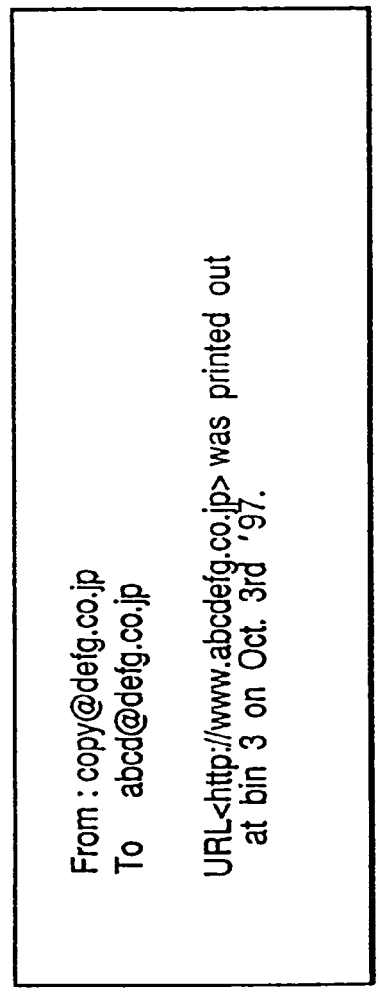
FIG. 30 is a diagram showing an example of a mail of a print result which is notified by the schedule job process in FIG. 28.

A procedure for executing the programs of the HTML Parser 402, HTTP client 403, and the like and printing the homepage of the WWW server will now be described. FIG. 27 is a flowchart showing a procedure for a command reception process in the image forming apparatus of FIG. 17. FIG. 28 is a flowchart showing a procedure for a schedule job process in the image forming apparatus of FIG. 17. FIG. 30 is a diagram showing an example of a mail of a print result which is notified by the schedule job process in FIG. 28. In the embodiment, although the procedure from the command request up to the processes such that the programs such as HTML Parser 402 and HTTP client 403 are executed and the homepage of the WWW server is printed is fundamentally the same as that in the embodiment 1, the procedure for the command reception process and the schedule job process differs. Therefore, the procedure for the command reception process and the schedule job process will now be described.

When a command is issued from any one of the operation unit, PC client 9, and schedule job process, the command reception process is executed. A module comprising the program to execute the command reception process and the CPU 122 is called a command receiving module (hereinafter, abbreviated to a CJM) here.

In the command reception process, as shown in FIG. 27, first in step S520, the CJM discriminates whether the received command is an inquiry command about the schedule job. When the received command is the inquiry command about the schedule job, step S521 follows. A schedule job list (time designation list) is obtained. In subsequent step S524, the obtained schedule job list is transmitted as a message to the receiving party which issued the inquiry command about the schedule job. The processing routine is finished. When the operation unit issues the inquiry command about the schedule job, in the operation unit, a time designation list shown in FIG. 24 is formed on the basis of the received message and is displayed.

When the received command is not the inquiry command about the schedule job, step S522 follows. The CJM discriminates whether the received command is a cancel command of the schedule job or not. When the received command is the cancel command of the schedule job, step S523 follows. The CJM cancels the designated job from the schedule list by the cancel command of the schedule job. In subsequent step S524, the schedule list after completion of the cancellation is transmitted as a message to the receiving party which issued the command. The processing routine is finished. When the operation unit issues the cancel command of the schedule job, in the operation unit, the time designation list shown in FIG. 24 is formed on the basis of the received message and is displayed.

When the received command is not the cancel command of the schedule job, step S551 follows. The CJM discriminates whether the received command is an inquiry command about an instant job or not. When the received command is the inquiry command about an instant job, step S552 follows. The CJM obtains an instant job list. In subsequent step S524, the obtained instant job list is sent as a message to the receiving party which issued the command. The processing routine is finished. When the operation unit issues the inquiry command about the instant job, in the operation unit, a waiting JOB list shown in FIG. 25 is formed on the basis of the received data and is displayed.

When the received command is not the inquiry command about the instant job, step S525 follows. The CJM discriminates whether the received command is an instant job cancel command or not. When the received command is the instant job cancel command, step S526 follows. A check is made to see if the designated job is being executed by the HTTP client 403 or HTML Parser 402. When the designated job is not being executed, step S527 follows. The CJM cancels the designated job from the instant job list. In subsequent step S524, the job list after completion of the cancellation is sent as a message to the receiving party which issued the command. The processing routine is finished. When the operation unit issues the cancel command of the instant job, in the operation unit, the waiting JOB list shown in FIG. 25 is updated on the basis of the received message and is displayed.

When the job whose cancellation was instructed is being executed by the HTTP client 403 or HTML Parser 402, step S529 follows. The CJM turns on the cancel flag and finishes the processing routine.

When the received command is not the instant job cancel command, step S528 follows. The CJM discriminates whether the received command is an instant print job command or not. When the received command is not the instant print job command, it is determined that the received command is a print command of the schedule job. In step S530, this job is registered into the schedule job list and the processing routine is finished.

When the received command is the instant print job command, the processing routine advances to the process of the HTTP client 403 in step S504 shown in FIG. 14.

Subsequently, the schedule job process will now be described with reference to FIGS. 28 and 30. A module comprising a program to execute the schedule job process and the CPU 122 is referred to as a schedule job module (hereinafter, abbreviated to an SJM).

The schedule job process is periodically activated once a minute. The schedule job is a job in which the day and time for execution have been set by a soft key 1832 (print time key) or a soft key 1833 (periodic access key).

In the schedule job process, as shown in FIG. 28, first in step S541, the SJM discriminates about the presence or absence of the schedule job. When there is no schedule job, this processing routine is finished. When there is the schedule job, step S542 follows. The SJM discriminates whether the print time which was set for the schedule job has reached or not. When the print time set for the schedule job does not reach yet, the processing routine is finished. When the print time set for the schedule job reaches, step S543 follows. The SJM transmits a print instruction command. When the print instruction command is transmitted, as mentioned above, the instant print job is received by the command reception process in step S502. By this command, the WWW server is accessed at the time designated in step S511 and the homepage is printed.

Subsequently, step S544 follows and the SJM discriminates the presence or absence of a result receiving party with reference to a result receiving party list (shown in FIG. 29). When the result receiving party does not exist, the processing routine is finished. When the result receiving party exists, step S545 follows. The SJM transmits a mail showing a print result to a corresponding destination in the result receiving party list and finishes the processes. A communication protocol SMTP is used for transmission of the mail showing the print result. A format of the mail showing the print result is set, for example, as shown in FIG. 30.

According to the embodiment as mentioned above, by setting the execution time in the Web print mode by the soft key 2052 (print time key), the job of the Web print mode can be reserved. The user can know an execution situation of the reserved job.

According to the image forming apparatus of the invention as described above, the apparatus has the printing function for obtaining the data held in the WWW server by accessing to the WWW server through the network, for converting the obtained data into the printable image data, and for printing the image data. Therefore, when the image forming apparatus is used as a common apparatus for the information processing apparatuses on the network, the data of the WWW server on the network can be directly obtained without passing through the information processing apparatus. There is no need to obtain the data from the WWW server and transfer the obtained data from the information processing apparatus through the network. A load which is applied to the network when the data obtained from the WWW server is printed can be reduced.

The invention can be constructed by: the input means for inputting print parameters such as a URL and the like for the WWW server; data obtaining means for obtaining the data held in the WWW server by accessing to the WWW server; image data forming means for forming image data from the data obtained by the data obtaining means; and printing means for printing the image data formed by the image data forming means.

According to the invention, the image forming apparatus has the printing function for obtaining data held in a WWW server by accessing to the WWW server through a network, for converting the obtained data into printable image data, and for printing the image data and controls the operation of the printing function on the basis of an operation instruction regarding the printing function supplied from an information processing terminal through the network. Therefore, the data can be directly obtained from the WWW server on the network without passing through the information processing apparatus. The operability regarding the printing of the data obtained from the WWW server can be improved.

According to the invention, the printing function can be constructed by: data obtaining means for obtaining data held in a WWW server by accessing to the WWW server; image data forming means for forming image data from the data obtained by the data obtaining means; and printing means for printing the image data formed by the image data forming means.

According to the invention, since the operation instruction includes an instruction of print parameters such as a URL for the WWW server and the like, an activation instruction, and a stop instruction, the operation instruction regarding the printing of the data obtained from the WWW server can be easily performed.

Since the invention has a printing function for obtaining the data held in the WWW server by accessing to the WWW server through the network, for converting the obtained data into the printable image data, and for printing the image data and has reserving means for reserving the execution of a job using the printing function, the data can be directly obtained from the WWW server on the network without passing through the information processing apparatus. It is also possible to set so as to execute the printing of the data obtained from the WWW server in accordance with a situation of the user.

According to the invention, the image forming apparatus further comprises: timer means for starting a counting from a time point when a reservation of a job by the reserving means occurs; and reservation cancelling means for cancelling the reservation of the job when the job reserved by the reserving means is not executed at a time point when the timer means counts a predetermined time. Thus, the job which cannot be executed can be automatically eliminated.

Further, since the invention also comprises notifying means for notifying the user who reserved the job of a fact that an executing order of the job reached when the executing order of the job reserved by the reserving means comes, the user can know an execution situation of the reserved job.

Further, the invention comprises: weighting means for adding a weight to the job when the job is reserved by the reserving means; and rearranging means for rearranging the executing order of the reserved job in accordance with the value weighted by the weighting means. Therefore, it is possible to reserve so as to preferentially execute the job.

Further, the invention comprises notifying means for notifying the user who reserved the job of an execution result of the job reserved by the reserving means. Therefore, the user can know the execution result of the reserved job.

Further, according to the invention, the reserving means accepts the reservation of the job using the printing function outputted through the network from the information processing terminal connected to the network. Therefore, the reservation of the job can be executed from the information processing terminal on the network.

Further, the invention can be constructed so as to use reservation data including print parameters such as a URL and the like and a print time for the WWW server for the reservation of the job using the printing function.

(Third Embodiment)

The third embodiment of the invention will now be described with reference to the constructional diagram of FIG. 3.

Figure 32:
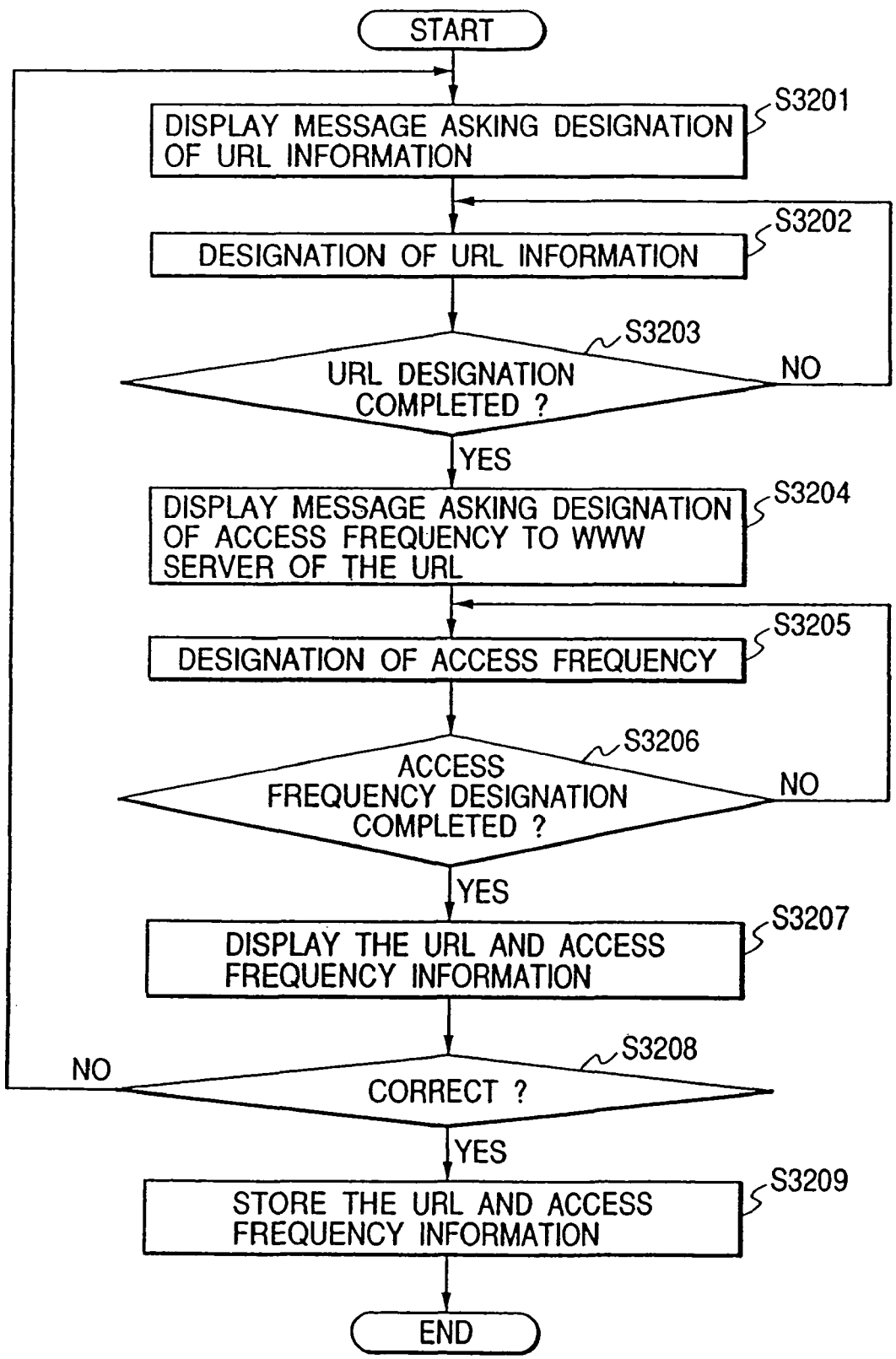
FIG. 32 is a flowchart showing a registering process of URL information and access frequency information.
Figure 33:
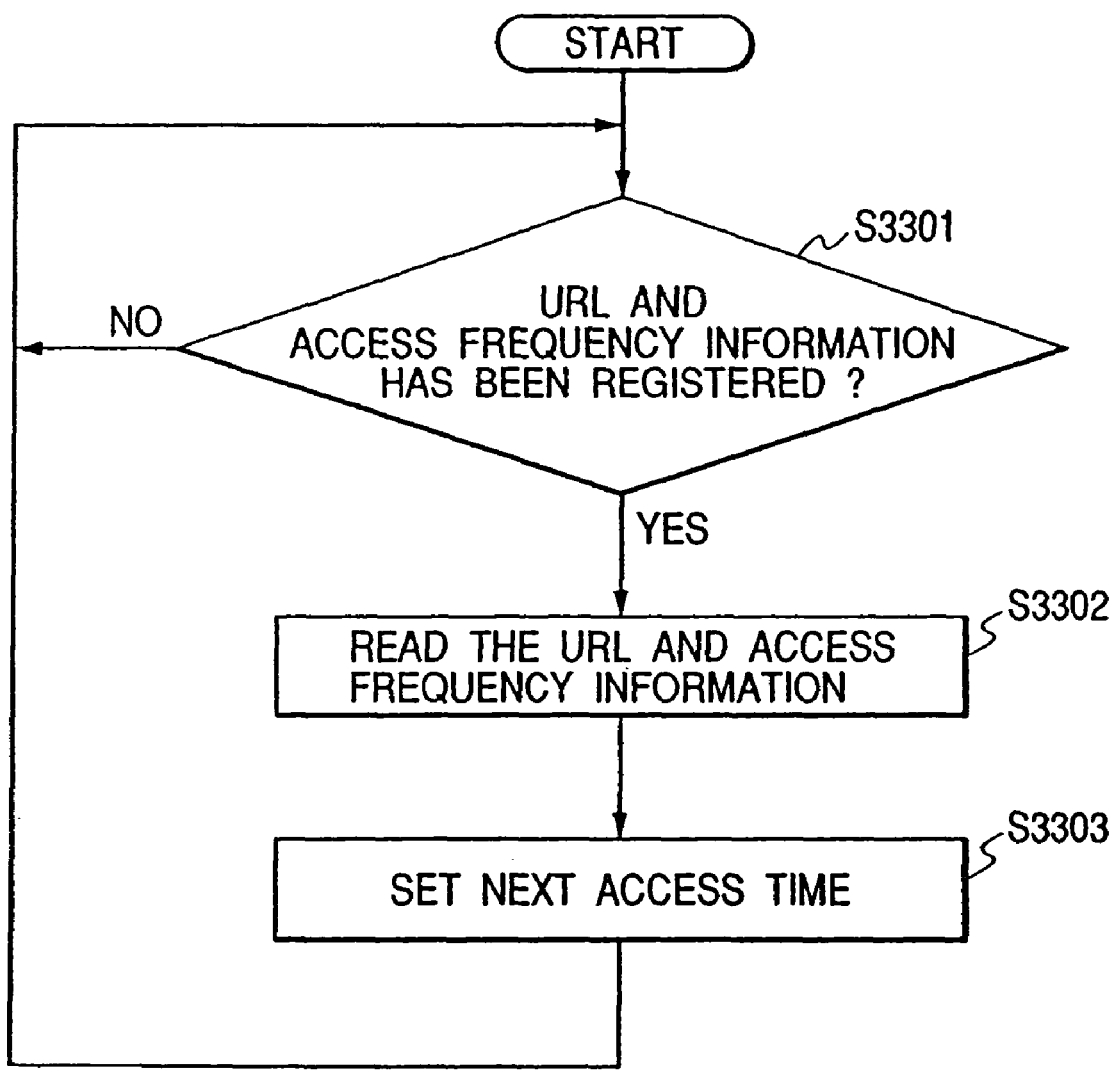
FIG. 33 is a flowchart showing a setting process of actual access day and time based on the registered access frequency information.
Figure 34:
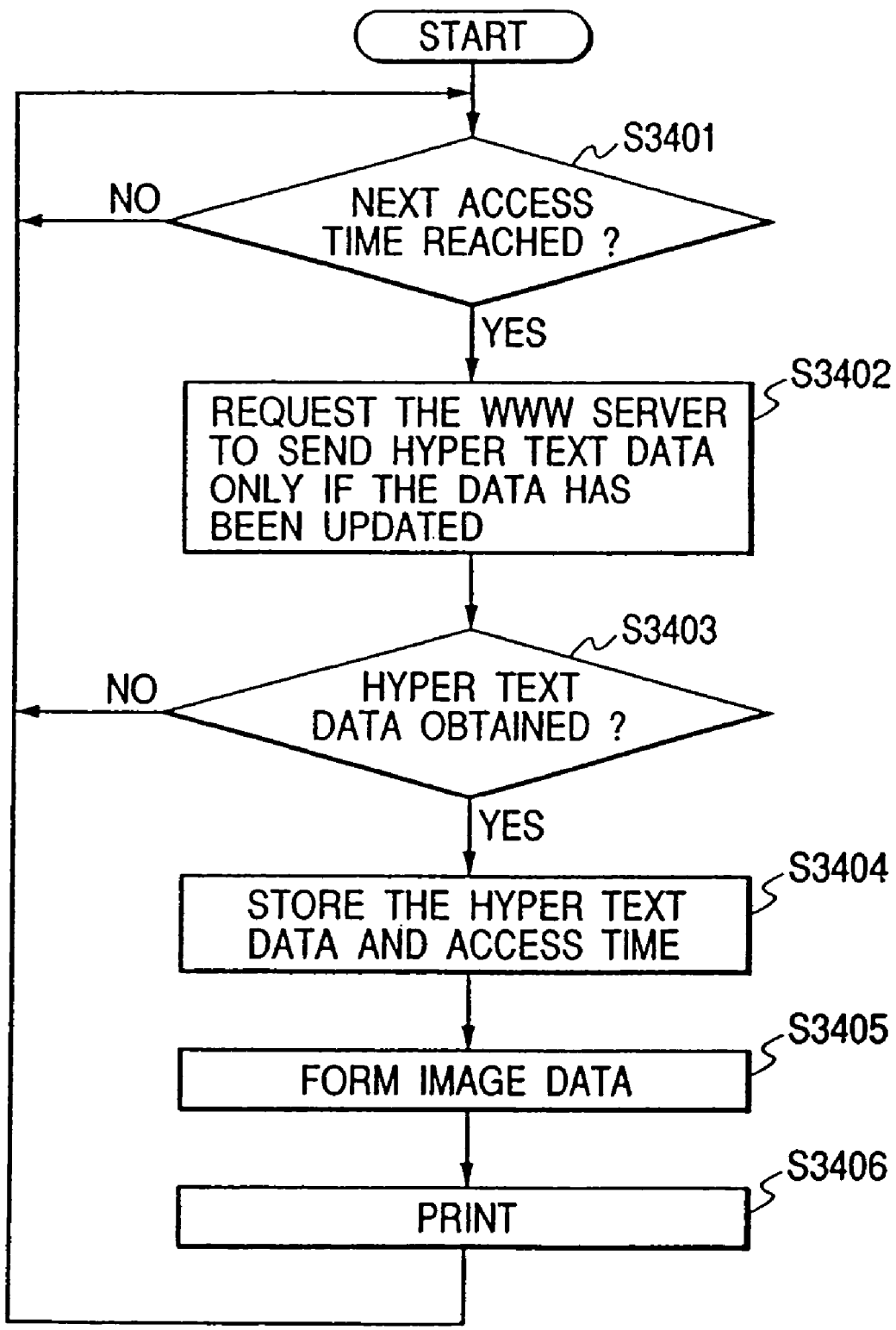
FIG. 34 is a flowchart showing a process for periodically and automatically obtaining and printing a hyper text in the first embodiment.

Processes which are peculiar to the embodiment will now be described in accordance with flowcharts of FIGS. 32 to 34.

First, a registering process of the URL information and access frequency information will be explained in accordance with the flowchart of FIG. 32.

By detecting a predetermined key operation signal, when the input unit 302 recognizes that a registering mode of the URL information and access frequency information has been set, this fact is notified as a data input request to the user I/F manager 303.

In response to the data input request from the input unit 302, the user I/F manager 303 displays a message asking the designation of the URL information of hyper text data whose printing is desired to the display 301 (step S3201).

The user I/F manager 303 accepts the designating operation of the URL information by the input unit 302 (step S3202) and discriminates whether the designating operation of the URL information has been finished or not (step S3203). Thus, if the designating operation of the URL information is not finished, the processing routine is returned to step S3202.

When the designating operation of the URL information is finished, the user I/F manager 303 displays a message asking the designation of the access frequency information to the WWW (World Wide Web) server of the designated URL to the display 301 (step S3204). The user I/F manager 303 accepts the designating operation of the access frequency information by the input unit 302 (step S3205) and discriminates whether the designating operation of the access frequency information has been finished or not (step S3206). Thus, if the designating operation of the access frequency information is not finished, the processing routine is returned to step S3205.

When the designating operation of the access frequency information is finished, the user I/F manager 303 displays the URL information and access frequency information inputted from the input unit 302 to the display 301 (step S3207), thereby allowing the user to recognize whether the URL information and access frequency information have correctly been registered or not (step S3208). When an acknowledgment signal is inputted from the input unit 302 and they have correctly been registered, the user I/F manager 303 stores the inputted URL information and access frequency information into the storage 304, thereby specifying (step S3209). The registering process is finished. When the acknowledgment signal is not inputted and they are not correctly registered, the processing routine is returned to step S3201 and the registering process is again executed.

A process for setting an actual access time point on the basis of the registered access frequency information will now be described in accordance with the flowchart of FIG. 33.

The core 2 inquires of the storage 304 whether the URL information and access frequency information have already been registered or not (step S3301). Thus, if they are not registered, the processing routine is returned to step S3301 and it is again inquired. When they have been registered, the URL information and access frequency information registered in the storage 304 are read out and stored into the RAM 307 in the core 2 (step S3302). The core 2 subsequently calculates the next access day and time of the hyper text data on the basis of the access frequency information stored in the RAM 307 and the present time and stores them into the RAM 307 in the core 2 (step S3303). The processing routine is returned to step S3301 and the next access-day and time are sequentially calculated.

For example, now assuming that the access frequency information indicates every 12 hours and the present time is 19:00, 7:00 is stored as a next access time. As access frequency information to be registered, besides the time period as mentioned above, (the number of days and the time), (the day of the week and the time), (the day of the month and the time), (the end or first day of the month and the time), or the like are considered. By calculating the actual access day and time on the basis of the access frequency information as mentioned above, a troublesomeness to register a number of actual access days and times every time can be omitted.

It is a better way to use a construction such that by displaying the calculated next access day and time as next access scheduled day and time to the display 301, the copying operation is not executed at the access day and time, thereby preventing that the printing process of the data regarding the access and the printing process regarding the copying process compete. In this case, although the access day and time can be also always displayed, when a display area is narrow, for example, it is sufficient to display them from a time point of 15 minutes before the access day and time.

A process for periodically and automatically obtaining and printing hyper text data will now be described with reference to the flowchart of FIG. 34.

The core 2 compares the present time with the next access day and time stored in the RAM 307, thereby discriminating whether the next access day and time have reached or not (step S3401). Thus, if the next access day and time do not reach, the processing routine is returned to step S3401 and the apparatus waits for the arrival of the next access day and time.

When the next access day and time come, the core 2 requests the relevant WWW server so that the hyper text data existing in the address shown by the URL information stored in the RAM 307 is transferred through the network I/F 4 by using the HTTP (Hyper Text Transfer Protocol) so long as the data has been updated as compared with the data which was previously derived (step S3402). In this instance, in the request of the first time, it is requested so as to certainly transfer, and in the request of the second time, the access day and time regarding the hyper text data which was previously obtained are transmitted to the WWW server on the request destination side so that the presence or absence of the data updating can be discriminated.

The core 2 discriminates whether the hyper text data has been transferred from the WWW server through the network I/F 4 or not (step S3403). Thus, when the hyper text data is not transferred, the processing routine is returned to step S3401. When the hyper text data is transferred, the hyper text data is sent to the hyper text storage 305 and stored and, at the same time, the access day and time when the hyper text data has been accessed are preserved in the RAM 307 as access day and time regarding the getting of the previous data (step S3404).

The hyper text storage 305 subsequently transfers the hyper text data to the formatter 6 and the formatter 6 forms image data (bit map data) which can be outputted by the printer 8 from the format of the hyper text data (step S3405). The formatter 6 sends the image data to the printer 8 and the printer 8 executes the printing operation (step S3406). The processing routine is returned to step S3401.

As mentioned above, by preliminarily registering the URL information and access frequency information, they are automatically and periodically accessed and the printing is executed. Therefore, the user does not need to periodically perform the accessing operation and printing operation and it is convenient. Since the hyper text data is transferred and printed so long as the data was updated, a situation such that the data of the same contents is printed in vain is eliminated. The papers are saved. The vain use of the printer or the like can be avoided.

When the hyper text data is printed, the URL information and the access information such as access day and time or the like can be also added as header information, footer information, or front cover information and printed.

Processes in this case are as follows. That is, when the obtained hyper text data is transferred and stored into the hyper text storage 305 in step S3404 in FIG. 34, the core 2 also sends the URL information and the access information such as access day and time or the like to the hyper text storage 305 and stores them. When the bit map data is formed on the basis of the hyper text data in step S3405, the formatter 6 forms the bit map data in a form such that the access information has been added as header information, footer information, or front cover information.

Figure 35:
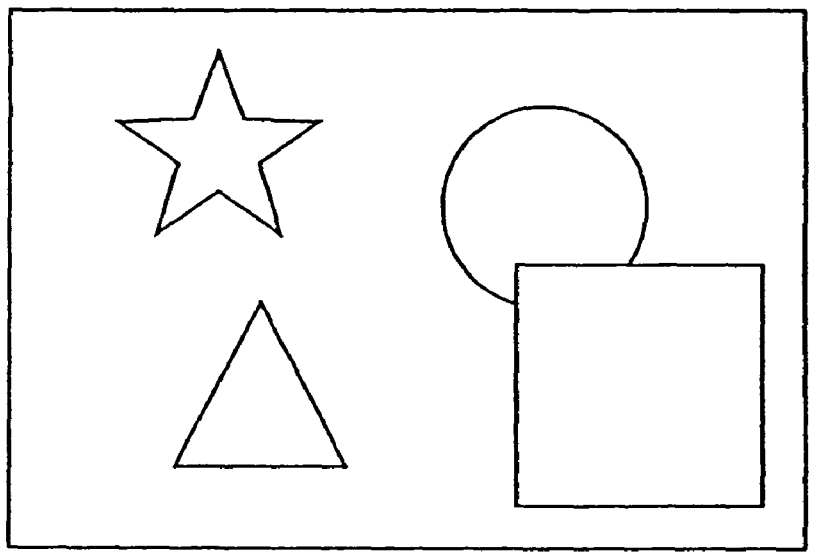
FIG. 35 is a diagram showing an example of a print of the hyper text in the case where the URL information and access day/time information are added as header information.
Figure 37:
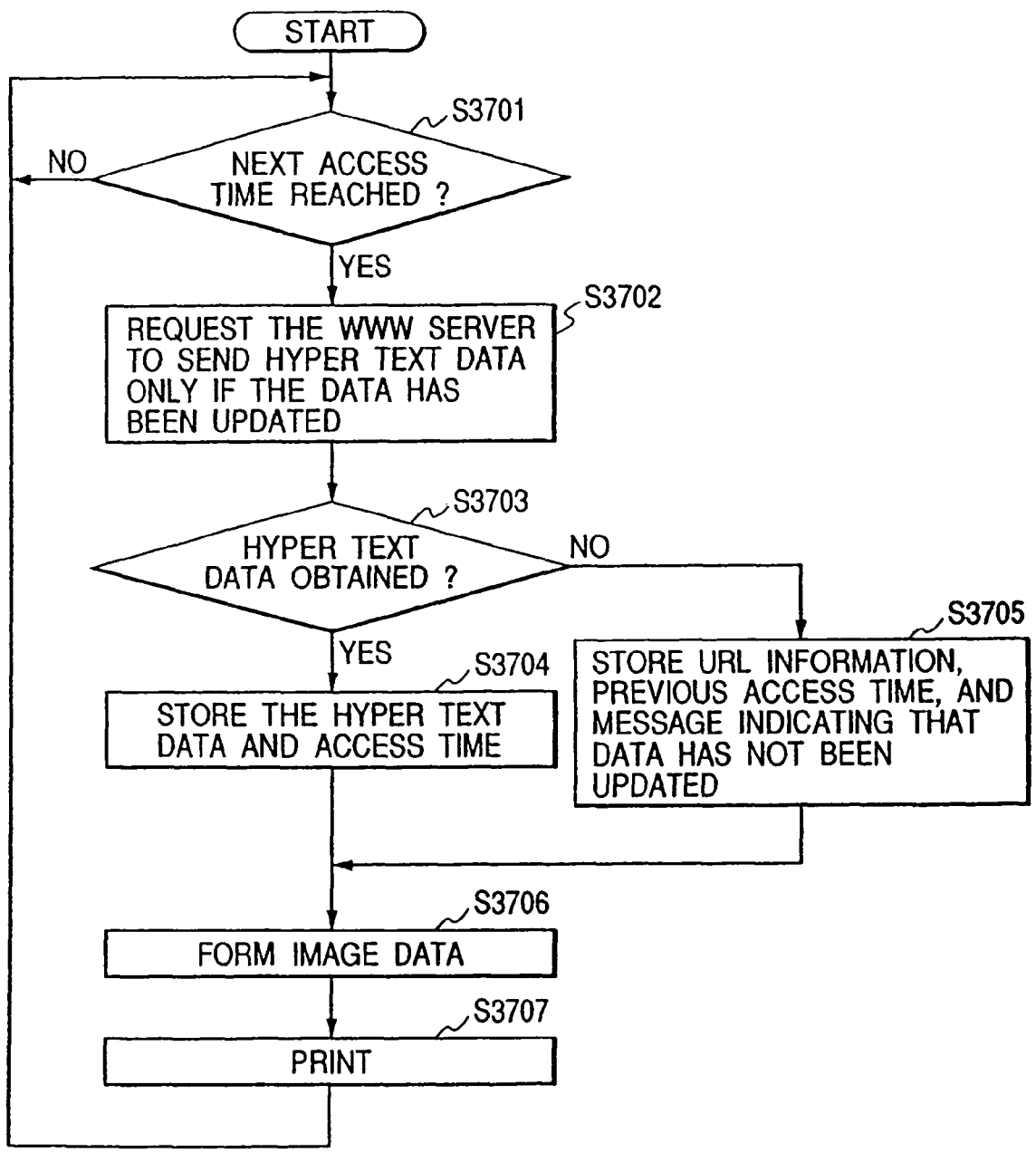
FIG. 37 is a flowchart showing a process for periodically and automatically obtaining and printing a hyper text in the fourth embodiment.

FIG. 35 shows an example of print in the case where the URL information and the access day and time have been added as header information. FIG. 36 shows an example of print in the case where the URL information and the access day and time have been added as front cover information. By adding the URL information and access day and time and printing as mentioned above, even in the case where a desired printed matter is mixed to the other printed matters in the sorter 220 or the like, the desired printed matter can be easily taken out.

(Fourth Embodiment)

In the third embodiment of the invention, when the data is not updated when periodically accessing, nothing is printed. In the fourth embodiment, however, a message indicative of a fact that the data is not updated is printed.

The core 2 compares the present time with the next access day and time stored in the RAM 307 and discriminates whether the next access day and time have reached or not (step S3701). Thus, if the next access day and time do not come, the processing routine is returned to step S3701. The apparatus waits for the arrival of the next access day and time.

When the next access day and time reach, the core requests the relevant WWW server through the network I/F 4 so that the hyper text data existing in the address shown by the URL information stored in the RAM 307 is transferred by using the HTTP so long as the data has been updated as compared with the data which was previously obtained (step S3702). In this instance, in the request of the first time, it is requested so as to certainly transfer, and in the request of the second time, the access day and time regarding the hyper text data which was previously obtained are transmitted to the WWW server on the request destination side so that the presence or absence of the data updating can be discriminated.

The core 2 discriminates whether the hyper text data has been transferred from the WWW server through the network I/F 4 or not (step S3703). Thus, when the hyper text data is transferred, the hyper text data is sent to the hyper text storage 305 and stored and, at the same time, the access day and time when the hyper text data has been accessed are preserved in the RAM 307 as access day and time regarding the getting of the previous data (step S3704). The processing routine advances to step S3706.

In this instance, as shown in the foregoing applied modification, by transferring and storing the URL information and access day and time to the hyper text storage-305, when the hyper text data is obtained, the access day and time and URL information can be also printed as header information, footer information, or front cover information.

On the other hand, when the hyper text data is not transferred, the URL information, the access day and time regarding the getting of the previous data, and message data indicating that the data is not updated are transferred and stored into the hyper text storage 305 (step S3705). Step S3706 follows.

In step S3706, the formatter 6 develops the data stored in the hyper text storage 305 into bit map data. The printer 8 executes the printing process on the basis of the bit map data (step S3707). The processing routine is returned to step S3701. FIG. 38 shows an example of print in the case where the data is not updated.

As mentioned above, when the data is not updated, by printing the message data showing such a fact together with the URL information and the access day and time regarding the getting of the previous data, the presence or absence of the updating of the hyper text data can be instantaneously discriminated and the use efficiency is improved.

(Fifth Embodiment)

Figure 39:
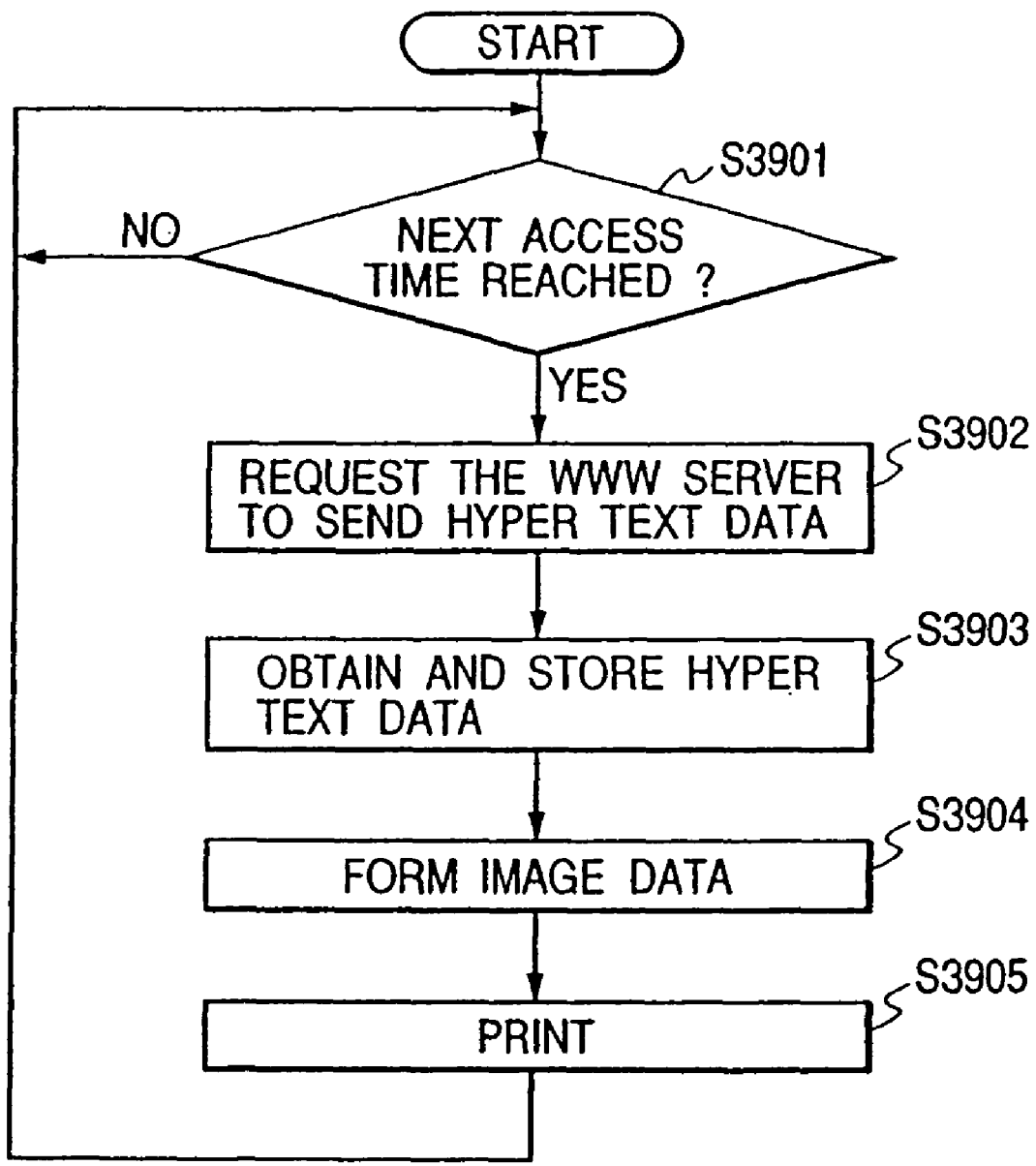
FIG. 39 is a flowchart showing a process for periodically and automatically obtaining and printing a hyper text in the third embodiment.

In the third and fourth embodiments, so long as the data has been updated, the hyper text data is obtained and printed. However, the hyper text data can be also periodically and automatically obtained and printed irrespective of the presence or absence of the data updating. Processes in this case will now be described with reference to a flowchart of FIG. 39.

The core 2 compares the present time with the next access day and time stored in the RAM 307 and discriminates whether the next access day and time have reached or not (step S3901). Thus, if the next access day and time do not come, the processing routine is returned to step S3901 and the apparatus waits for the arrival of the next access day and time. On the other hand, when the next access day and time reach, the core 2 requests the WWW server through the network I/F 4 so that the hyper text data existing in the address shown by the URL information stored in the RAM 307 is sent by using the HTTP (step S3902).

The core 2 transfers the hyper text data sent from the WWW server through the network I/F 4 to the hyper text storage 305 and stores (step S3903). The hyper text storage 305 transfers the hyper text data to the formatter 6 and the formatter 6 forms image data (bit map data) which can be outputted by the printer 8 from the format of the hyper text data (step S3904). The formatter 6 transfers the image data to the printer 8 and the printer 8 executes the printing process (step S3905). The processing routine is returned to step S3901.

Even in the fifth embodiment, by processes as mentioned above, when the hyper text data is printed, the URL information and the access information such as access day and time or the like can be also added as header information, footer information, or front cover information and printed.

The invention is not limited to the foregoing embodiments but, for example, can be also applied to a construction such that a key word, the number of stages of the links, and the like are preliminarily registered together with the URL information, an access is requested on the basis of those information, on the WWW server side which received the access request, the hyper text data regarding the hyper text data shown by the URL information is retrieved within a range of the number of stages of the links on the basis of the key word, and the concerning hyper text data is transmitted to a copier on the requesting source side together with the hyper text data shown by the URL information and printed.

The hyper text data can be also provided by a server other than the WWW server on the internet or, further, can be also provided by a server on a network other than the internet.

By registering a plurality of URL information together with the access day and time, a plurality of kinds of hyper text data can be also automatically and periodically printed. In this case, it is desirable to construct such that by registering different access day and time every hyper text data, thereby avoiding that the data transmission and reception compete.

Further, the invention is not limited to the copier but can be also applied to a single printing apparatus or a printing apparatus connected to a personal computer.

According to the invention as described above, there is provided the printing apparatus for accessing and printing hyper text data on a network, comprising: registering means for registering address information and access frequency information on the network in the hyper text data as an access target; accessing means for periodically accessing the hyper text data existing at a location shown by the address information regarding the registration in accordance with the access frequency information registered by the registering means; and print control means for printing the hyper text data accessed by the accessing means. Therefore, a specific information resource which is provided by the server on the computer network can be automatically and periodically accessed and printed. A troublesomeness of the user is omitted and the use efficiency is improved.

What is claimed is:

1. A copying apparatus comprising:
   a reading unit constructed to input image data by reading an original document;
   a printing unit constructed to perform printing based on the image data input by the reading unit or externally received data;
   an operation unit, including a display unit, constructed to accept an operation by a user, wherein a first soft key to be used by the user for selecting a copy mode and a second soft key to be used by the user for selecting a web mode are displayed on the display unit included in the operation unit;
   a first display controlling unit constructed to cause the display unit to display a screen for inputting a parameter for a copying process when the first soft key displayed on the display unit is selected by the user, and to cause the display unit to display a setting screen for a web process when the second soft key displayed on the display unit is selected by the user;
   a register unit constructed to register a URL input by a user into a storage unit, wherein the URL corresponds to data held in a WWW server, and the storage unit can register plural URLs;
   a second display controlling unit constructed to cause the display unit to display a virtual keyboard and cause the display unit to display a URL input by the user with use of the virtual keyboard when a third soft key is selected by the user on the setting screen for the web process displayed on the display unit, and to cause the display unit to display a list of the plural URLs registered by the register unit and cause the display unit to display the URL selected by the user from the list when a fourth soft key is selected by the user on the setting screen for the web process displayed on the display unit; and
   an obtaining unit constructed to access, directly by a WWW client provided in the copying apparatus, a WWW server through the network and obtain the data held in the WWW server, on the basis of the URL input by the user with use of the virtual keyboard or the URL selected by the user from the list.

2. A copying apparatus according to claim 1, further comprising a print setting unit constructed to execute a print setting for printing the data by said printing unit.

3. A copying apparatus according to claim 2, wherein said print setting unit sets, as the print setting, whether or not to print, together with the data held in the WWW server, the URL of said data.

4. A copying apparatus according to claim 2, wherein said print setting unit sets, as the print setting, whether or not to print, together with the data held in the WWW server, a title of said data.

5. A copying apparatus according to claim 2, wherein said print setting unit sets, as the print setting, in a case where the data held in the WWW server represents an image for drawing a background, whether or not to print the background.

6. A copying apparatus according to claim 2, wherein said print setting unit sets, as the print setting, a schedule for periodically obtaining the data held in the WWW server.

7. A copying apparatus according to claim 6, further comprising a judgment unit constructed to judge, in the case where the schedule is set by said print setting unit, whether or not the schedule is satisfied,
   wherein, in a case where it is judged by said judgment unit that the schedule is satisfied, said obtaining unit accesses the WWW server through the network and obtains the data held in the WWW server.

8. A copying apparatus according to claim 2, wherein said print setting unit sets, as the print setting, according to a hyper-link in regard to the data held in the WWW server, whether or not to print the data at a hyper-linked destination.

9. A copying method executed by a copying apparatus comprising:
   a reading step of inputting image data by reading an original document;
   a printing step of printing based on the image data input by the reading step or externally received data;
   an operation step, including a display step, of accepting an operation by a user, wherein a first soft key to be used by the user for selecting a copy mode and a second soft key to be used by the user for selecting a web mode are displayed on a display unit in the display step included in the operation step;
   a first display controlling step of causing the display unit to display a screen for inputting a parameter for a copying process when the first soft key displayed on the display unit is selected by the user, and to cause the display unit to display a setting screen for a web process when the second soft key displayed on the display unit is selected by the user;
   a registering step of registering a URL input by a user into a storage unit, wherein the URL corresponds to data held in a WWW server, and the storage unit can register plural URLs;
   a second display controlling step of causing the display unit to display a virtual keyboard and causing the display unit to display a URL input by the user with use of the virtual keyboard when a third soft key is selected by the user on the setting screen for the web process displayed on the display unit, and causing the display unit to display a list of the plural URLs registered by the register step and causing the display unit to display the URL selected by the user from the list when a fourth soft key is selected by the user on the setting screen for the web process displayed on the display unit; and
   an obtaining step of accessing, directly by a WWW client provided in the copying apparatus, a WWW server through the network and obtaining the data held in the WWW server, on the basis of the URL input by the user with use of the virtual keyboard or the URL selected by the user from the list.

10. A method according to claim 9, further comprising a print setting step constructed to execute a print setting for printing the data by said printing step.

11. A method according to claim 10, wherein said print setting step sets, as the print setting, whether or not to print, together with the data held in the WWW server, the URL of said data.

12. A method according to claim 10, wherein said print setting step sets, as the print setting, whether or not to print, together with the data held in the WWW server, a title of said data.

13. A method according to claim 10, wherein said print setting step sets, as the print setting, in a case where the data held in the WWW server represents an image for drawing a background, whether or not to print the background.

14. A method according to claim 10, wherein said print setting step sets, as the print setting, a schedule for periodically obtaining the data held in the WWW server.

15. A method according to claim 14, further comprising a judgment step of judging, in the case where the schedule is set by said print setting step, whether or not the schedule is satisfied,
   wherein, in a case where it is judged by said judgment step that the schedule is satisfied, said obtaining step accesses the WWW server through the network and obtains the data held in the WWW server.

16. A method according to claim 10, wherein said print setting step sets, as the print setting, according to a hyper-link in regard to the data held in the WWW server, whether or not to print the data at a hyper-linked destination.

17. A non-transitory computer-readable storage medium on which is stored code for a computer-executable program executable by a copying apparatus to execute a printing method comprising:
   a reading step of inputting image data by reading an original document;
   a printing step of printing based on the image data input by the reading step or externally received data;
   an operation step, including a display step, of accepting an operation by a user, wherein a first soft key to be used by the user for selecting a copy mode and a second soft key to be used by the user for selecting a web mode are displayed on a display unit by the display step included in the operation step;
   a first display controlling step of causing the display unit to display a screen for inputting a parameter for a copying process when the first soft key displayed on the display unit is selected by the user, and causing the display unit to display a setting screen for a web process when the second soft key displayed on the display unit is selected by the user;
   a registering step of registering a URL input by a user into a storage unit, wherein the URL corresponds to data held in a WWW server, and the storage unit can register plural URLs;
   a second display controlling step of causing the display unit to display a virtual keyboard and causing the display unit to display a URL input by the user with use of the virtual keyboard when a third soft key is selected by the user on the setting screen for the web process displayed on the display unit, and causing the display unit to display a list of the plural URLs registered by the register step and causing the display unit to display the URL selected by the user from the list when a fourth soft key is selected by the user on the setting screen for the web process displayed on the display unit; and
   an obtaining step of accessing, directly by a WWW client provided in the copying apparatus, a WWW server through the network and obtaining the data held in the WWW server, on the basis of
   the URL input by the user with use of the virtual keyboard or the URL selected by the user from the list.

* * * * *